(12) United States Patent
Dlugosch

(10) Patent No.: US 9,785,847 B2
(45) Date of Patent: Oct. 10, 2017

(54) ANALYZING DATA USING A HIERARCHICAL STRUCTURE

(71) Applicant: Micron Technology, Inc., Boise, ID (US)

(72) Inventor: Paul Dlugosch, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 795 days.

(21) Appl. No.: 14/087,904

(22) Filed: Nov. 22, 2013

(65) Prior Publication Data

US 2014/0082009 A1    Mar. 20, 2014

Related U.S. Application Data

(63) Continuation of application No. 12/943,551, filed on Nov. 10, 2010, now Pat. No. 8,601,013.

(60) Provisional application No. 61/353,546, filed on Jun. 10, 2010.

(51) Int. Cl.
    *G06K 9/00*      (2006.01)
    *G06N 99/00*     (2010.01)

(52) U.S. Cl.
    CPC ....... *G06K 9/00973* (2013.01); *G06N 99/005* (2013.01)

(58) Field of Classification Search
    None
    See application file for complete search history.

(56) References Cited

U.S. PATENT DOCUMENTS

| 5,081,608 A | 1/1992 | Tamura et al. |
| 5,537,580 A | 7/1996 | Giomi et al. |
| 5,729,678 A | 3/1998 | Hunt et al. |

(Continued)

FOREIGN PATENT DOCUMENTS

| CN | 1894559 A | 1/2007 |
| CN | 101013452 A | 8/2007 |

(Continued)

OTHER PUBLICATIONS

Galtier, Virginie, Olivier Pietquin, and Stephane Vialle. "Adaboost parallelization on pc clusters with virtual shared memory for fast feature selection." Signal Processing and Communications, 2007. ICSPC 2007. IEEE International Conference on. IEEE, 2007.*

(Continued)

*Primary Examiner* — Luis Sitiriche
*Assistant Examiner* — Daniel Pellett
(74) *Attorney, Agent, or Firm* — Schwegman Lundberg & Woessner, P.A.

(57) ABSTRACT

Apparatus, systems, and methods for analyzing data are described. The data can be analyzed using a hierarchical structure. One such hierarchical structure can comprise a plurality of layers, where each layer performs an analysis on input data and provides an output based on the analysis. The output from lower layers in the hierarchical structure can be provided as inputs to higher layers. In this manner, lower layers can perform a lower level of analysis (e.g., more basic/fundamental analysis), while a higher layer can perform a higher level of analysis (e.g., more complex analysis) using the outputs from one or more lower layers. In an example, the hierarchical structure performs pattern recognition.

20 Claims, 13 Drawing Sheets

(56) References Cited

U.S. PATENT DOCUMENTS

| | | |
|---|---|---|
| 5,784,298 A | 7/1998 | Hershey et al. |
| 5,831,853 A | 11/1998 | Bobrow et al. |
| 6,262,594 B1 | 7/2001 | Cheung et al. |
| 6,507,903 B1 | 1/2003 | Beatty et al. |
| 6,564,336 B1 | 5/2003 | Majkowski |
| 6,748,588 B1 | 6/2004 | Fraser et al. |
| 6,832,378 B1 | 12/2004 | Beatty et al. |
| 7,020,850 B2 | 3/2006 | Raghavan et al. |
| 7,039,233 B2 | 5/2006 | Mori et al. |
| 7,140,018 B1 | 11/2006 | Beatty et al. |
| 7,170,891 B2 | 1/2007 | Messenger |
| 7,171,561 B2 | 1/2007 | Noga |
| 7,392,229 B2 | 6/2008 | Harris et al. |
| 7,392,409 B2 | 6/2008 | Tateyama |
| 7,487,131 B2 | 2/2009 | Harris et al. |
| 7,487,542 B2 | 2/2009 | Boulanger et al. |
| 7,505,893 B2 | 3/2009 | Mizutani et al. |
| 7,546,354 B1 | 6/2009 | Fan et al. |
| 7,693,853 B2 | 4/2010 | Bellamy et al. |
| 7,761,851 B2 | 7/2010 | Bailey et al. |
| 7,774,286 B1 | 8/2010 | Harris |
| 7,917,684 B2 | 3/2011 | Noyes et al. |
| 7,970,964 B2 | 6/2011 | Noyes |
| 8,051,022 B2 | 11/2011 | Pandya |
| 8,065,249 B1 | 11/2011 | Harris |
| 8,140,780 B2 | 3/2012 | Noyes |
| 8,601,013 B2 | 12/2013 | Dlugosch |
| 8,726,253 B2 | 5/2014 | Glendenning et al. |
| 8,726,256 B2 | 5/2014 | Xu et al. |
| 8,788,991 B2 | 7/2014 | Xu et al. |
| 8,843,911 B2 | 9/2014 | Xu et al. |
| 9,104,828 B2 | 8/2015 | Xu et al. |
| 9,146,714 B2 | 9/2015 | Glendenning et al. |
| 9,298,437 B2 | 3/2016 | Xu et al. |
| 9,471,290 B2 | 10/2016 | Xu et al. |
| 2003/0014743 A1 | 1/2003 | Cooke et al. |
| 2003/0066050 A1 | 4/2003 | Wang et al. |
| 2003/0145304 A1 | 7/2003 | Carter |
| 2004/0133869 A1 | 7/2004 | Sharma |
| 2005/0268258 A1 | 12/2005 | Decker |
| 2006/0020589 A1 | 1/2006 | Wu et al. |
| 2007/0005355 A1 | 1/2007 | Tian et al. |
| 2007/0112701 A1* | 5/2007 | Chellapilla ......... G06K 9/6256 706/15 |
| 2007/0179639 A1 | 8/2007 | Sakai |
| 2007/0192110 A1 | 8/2007 | Mizutani et al. |
| 2007/0296458 A1 | 12/2007 | Kelem et al. |
| 2008/0126280 A1* | 5/2008 | Liu ...................... G06N 99/005 706/20 |
| 2008/0140600 A1 | 6/2008 | Pandya |
| 2008/0141233 A1 | 6/2008 | Gurevich et al. |
| 2008/0147577 A1* | 6/2008 | Bi ........................ G06F 19/321 706/12 |
| 2008/0168013 A1 | 7/2008 | Cadaret |
| 2008/0201281 A1* | 8/2008 | Graf .................... G06K 9/6269 706/12 |
| 2008/0319932 A1* | 12/2008 | Yih ..................... G06K 9/6256 706/20 |
| 2010/0100518 A1 | 4/2010 | Andrade et al. |
| 2010/0100691 A1 | 4/2010 | Noyes et al. |
| 2010/0100714 A1 | 4/2010 | Noyes et al. |
| 2010/0115347 A1 | 5/2010 | Noyes et al. |
| 2010/0118425 A1 | 5/2010 | Rafaelof |
| 2010/0121643 A1 | 5/2010 | Mohajer et al. |
| 2010/0131935 A1 | 5/2010 | Wang |
| 2010/0138432 A1 | 6/2010 | Noyes et al. |
| 2010/0138575 A1 | 6/2010 | Noyes |
| 2010/0138634 A1 | 6/2010 | Noyes et al. |
| 2010/0138635 A1 | 6/2010 | Noyes |
| 2010/0169510 A1 | 7/2010 | Ho et al. |
| 2010/0174887 A1 | 7/2010 | Pawlowski |
| 2010/0174929 A1 | 7/2010 | Pawlowski |
| 2010/0175130 A1 | 7/2010 | Pawlowski |
| 2010/0185647 A1 | 7/2010 | Noyes |
| 2010/0293153 A1 | 11/2010 | Zhao et al. |
| 2010/0325633 A1 | 12/2010 | Eguro et al. |
| 2010/0332809 A1 | 12/2010 | Noyes et al. |
| 2011/0145182 A1 | 6/2011 | Dlugosch et al. |
| 2011/0145271 A1 | 6/2011 | Noyes et al. |
| 2011/0145544 A1 | 6/2011 | Noyes et al. |
| 2011/0258360 A1 | 10/2011 | Noyes |
| 2011/0307433 A1 | 12/2011 | Dlugosch |
| 2011/0307503 A1 | 12/2011 | Dlugosch |
| 2012/0192163 A1 | 7/2012 | Glendenning et al. |
| 2012/0192164 A1 | 7/2012 | Xu et al. |
| 2012/0192165 A1 | 7/2012 | Xu et al. |
| 2012/0192166 A1 | 7/2012 | Xu et al. |
| 2014/0229925 A1 | 8/2014 | Glendenning et al. |
| 2014/0229926 A1 | 8/2014 | Xu et al. |
| 2014/0380288 A1 | 12/2014 | Xu et al. |
| 2015/0046889 A1 | 2/2015 | Xu et al. |
| 2016/0019034 A1 | 1/2016 | Glendenning et al. |
| 2016/0170728 A1 | 6/2016 | Xu et al. |

FOREIGN PATENT DOCUMENTS

| | | |
|---|---|---|
| CN | 101339501 A | 1/2009 |
| CN | 101360088 A | 2/2009 |
| CN | 101499065 A | 8/2009 |
| CN | 101099147 B | 5/2010 |
| CN | 103003792 A | 3/2013 |
| CN | 103430148 A | 12/2013 |
| CN | 103443767 A | 12/2013 |
| CN | 103547998 A | 1/2014 |
| CN | 103547999 A | 1/2014 |
| CN | 103003792 B | 5/2016 |
| CN | 105912992 A | 8/2016 |
| EP | 2184687 A1 | 5/2010 |
| JP | 04291662 A | 10/1992 |
| JP | 2002358500 A | 12/2002 |
| JP | 2005122466 A | 5/2005 |
| JP | 2005353061 A | 12/2005 |
| JP | 2009093599 A | 4/2009 |
| TW | 505854 B | 10/2002 |
| TW | 505855 B | 10/2002 |
| TW | 505856 B | 10/2002 |
| TW | 201237748 A | 9/2012 |
| TW | 201239765 A | 10/2012 |
| TW | 201246071 A | 11/2012 |
| TW | 201246081 A | 11/2012 |
| WO | WO-2005038645 | 4/2005 |
| WO | WO-2009029698 A1 | 3/2009 |
| WO | WO-2010018710 A1 | 2/2010 |
| WO | WO-2011156634 A2 | 12/2011 |
| WO | WO-2011156634 A3 | 12/2011 |
| WO | WO-2012103143 A2 | 8/2012 |
| WO | WO-2012103146 A2 | 8/2012 |
| WO | WO-2012103148 A2 | 8/2012 |
| WO | WO-2012103151 A2 | 8/2012 |

OTHER PUBLICATIONS

Geremy, Heitz, et al. "Cascaded Classification Models: Combining Models for Holistic Scene Understanding." (2008).*

Polikar, Robi. "Ensemble based systems in decision making." IEEE Circuits and systems magazine 6.3 (2006): 21-45.*

Baeza-Yates, Ricardo, and Gonzalo Navarro. "Faster approximate string matching." Algorithmica 23.2 (1999): 127-158.*

Dumais, Susan, and Hao Chen. "Hierarchical classification of Web content."Proceedings of the 23rd annual international ACM SIGIR conference on Research and development in information retrieval. ACM, 2000.*

Dundar, M. Murat, and Jinbo Bi. "Joint optimization of cascaded classifiers for computer aided detection." 2007 IEEE Conference on Computer Vision and Pattern Recognition. IEEE, 2007.*

"Chinese Application Serial No. 201180034987.3 Response dated Dec. 19, 2014 to Non-Final Office Action dated Oct. 8, 2014", W/ English claims, 21 pgs.

"Japanese Application Serial No. 2013-514372 Response dated Mar. 5, 2015 to Office Action dated Aug. 5, 2014", With the English claims, 17 pgs.

(56) References Cited

OTHER PUBLICATIONS

"Japanese Application Serial No. 2013-550669, Notice of Rejection dated Mar. 17, 2015", with English Translation, 7 pgs.
"Japanese Application Serial No. 2013-550671, Notice of Rejection dated Mar. 24, 2015", With English Translation, 7 pgs.
"Taiwan Application Serial No. 100120418 Response dated Apr. 10, 2015 to Office Action dated Feb. 5, 2015", W/ English Claims, 5 pgs.
"Taiwanese Application Serial No. 100120418, Office Action dated Jan. 12, 2015", W/ English Translation, 28 pgs.
Polikar, R, "Ensemble Based Systems in Decision Making", IEEE Circuits and Systems Magazine, vol. 6, No. 3, (2006), 21-45.
Shinya, Ryoma, et al., "Implementation of Regular Expression Engine with Dynamic Code Generation", (Jan. 2011), 173-180.
"Chinese Application Serial No. 201180034987.3, Office Action dated Mar. 25, 2015", W/ English Tranlations, 17 pgs.
"Taiwanese Application Serial No. 100120418, Decision of Rejection dated May 20, 2015", W/ English Translation, 12 pgs.
"International Application Serial No. PCT/US2011/039849, International Preliminary Report on Patentability dated Dec. 20, 2012", 6 pgs.
"International Application Serial No. PCT/US2011/039849, International Search Report dated Feb. 9, 2012", 3 pgs.
"International Application Serial No. PCT/US2011/039849, Written Opinion dated Feb. 9, 2012", 4 pgs.
Yang, Jeehong, et al., "An Approach to Graph and Netlist Compression", Data Compression Conference, [Online]. Retrieved from the Internet: <URL: http://comparch.doc.ic.ac.uk/publications/files/Jeehong08Dcc08.pdf>, (2008), 33-42.
Zhang, C, et al., "Intrusion Detection Using Hierarchical Neural Networks", Pattern Recognition Letters, 26(6), (May 1, 2005), 779-791.
"U.S. Appl. No. 14/252,600, PTO Response to Rule 312 Communication dated Oct. 27, 2015", 1 pgs.
"U.S. Appl. No. 14/478,712, Examiner Interview Summary dated Sep. 15, 2015", 3 pgs.
"U.S. Appl. No. 14/478,712, Notice of Allowance dated Oct. 22, 2015", 9 pgs.
"U.S. Appl. No. 14/868,047, Preliminary Amendment dated Oct. 16, 2015", 8 pgs.
"Chinese Application Serial No. 201180034987.3, Office Action dated Sep. 6, 2015", W/ English Translation, 6 pgs.
"Chinese Application Serial No. 201180034987.3, Response dated Nov. 23, 2015 to Office Action dated Sep. 6, 2015", W/ English Claims, 27 pgs.
"Taiwanese Application Serial No. 100120418, Response dated Nov. 25, 2015 to Decision of Rejection dated May 20, 2015", W/ English Claims, 44 pgs.
"U.S. Appl. No. 14/252,600, Notice of Allowance dated Aug. 19, 2015", 9 pgs.
"U.S. Appl. No. 14/478,712, Response dated Sep. 8, 2015 to Non Final Office Action dated Jun. 5, 2015", 9 pgs.
"Chinese Application Serial No. 201180034987.3 Response dated Jun. 9, 2015 to Office Action dated Mar. 25, 2015", With the English claims, 14 pgs.
"European Application Serial No. 11793185.7, Extended European Search Report dated Jul. 6, 2015", 7 pgs.
Bishop, Christopher, "The Multi-Layer Perceptron In: Neural Networks for Pattern Recognition", Oxford University Press, (Dec. 31, 1995), 116-160.
Neveu, J N P, et al., "Implementation of the neocognitron on a SIMD architecture", Intelligent Information Systems, (Nov. 29, 1994), 179-183.
Vasconcelos, G C, et al., "Efficient Detection of Spurious Inputs for Improving the Robustness of MLP Networks in Practical Applications", Neural Computing and Applications, Springer-Verlag LO, vol. 3, No. 4, (Jan. 1, 1995), 202-212.
"Chinese Application Serial No. 10756723.2, Amendment dated Aug. 22, 2013", w/English Claims, 18 pgs.
"Chinese Application Serial No. 201180034987.3, Office Action dated Mar. 4, 2014", w/English Translation, 21 pgs.
"European Application Serial No. 11793185.7, Amendment dated Sep. 3, 2013", 7 pgs.
"Chinese Application Serial No. 201180034987.3, Office Action dated Oct. 8, 2014", W/ English Translation, 18 pgs.
"Chinese Application Serial No. 201180034987.3, Response dated Jul. 17, 2014 to Office Action dated Mar. 4, 2014", W/ English Claims, 4 pgs.
"Chinese Application Serial No. 201280012402.2, Amendment dated Jan. 16, 2014", W/ English Claims, 18 pgs.
"Chinese Application Serial No. 201280013903.2, Voluntary Amendment dated May 8, 2014", W/ English Translation, 27 pgs.
"Chinese Application Serial No. 201280013925.9 Response dated Oct. 23, 2014 to Non-Final Office Action dated Sep. 23, 2014", With the English claims, 19 pgs.
"Chinese Application Serial No. 201280013925.9, Amendment dated Jan. 26, 2014", w/English Claims, 13 pgs.
"Chinese Application Serial No. 201280013925.9, Office Action dated Mar. 3, 2014", w/English Translation, 10 pgs.
"Chinese Application Serial No. 201280013925.9, Office Action dated Aug. 8, 2014", W/ English Translation, 13 pgs.
"Chinese Application Serial No. 201280013925.9, Response dated Jul. 16, 2014 to Office Action dated Mar. 3, 2014", W/ English Claims, 14 pgs.
"European Application Serial No. 12739387.4, Extended European Search Report dated May 27, 2014", 8 pgs.
"European Application Serial No. 12739387.4, Office Action dated Sep. 13, 2013", 2 pgs.
"European Application Serial No. 12739387.4, Response dated Mar. 21, 2014 to Office Action dated Sep. 13, 2013", 12 pgs.
"European Application Serial No. 12739387.4, Response dated Nov. 27, 2014 to Extended European Search Report dated May 27, 2014", 11 pgs.
"European Application Serial No. 12739626.5, Extended European Search Report dated Jun. 18, 2014", 7 pgs.
"European Application Serial No. 12739626.5, Office Action dated Sep. 17, 2013", (Sep. 17, 2013), 2 pgs.
"European Application Serial No. 12739626.5, Response dated Mar. 21, 2014 to Office Action dated Sep. 17, 2013", 10 pgs.
"European Application Serial No. 12739626.5, Response dated Dec. 11, 2014 to European Extended Search Report dated Jun. 18, 2014", 11 pgs.
"European Application Serial No. 12739650.5, Office Action dated Sep. 13, 2013", 2 pgs.
"European Application Serial No. 12739650.5, Response dated Mar. 21, 2014 to Office Action dated Sep. 13, 2013", 12 pgs.
"European Application Serial No. 12739652.1, Office Action dated Sep. 13, 2013", 2 pgs.
"European Application Serial No. 12739652.1, Response dated Mar. 21, 2014 to Office Action dated Sep. 13, 2013", 8 pgs.
"International Application Serial No. PCT/US2012/022435, International Preliminary Report on Patentability dated Aug. 8, 2013", 8 pgs.
"International Application Serial No. PCT/US2012/022435, Search Report dated Aug. 31, 2012", 3 pgs.
"International Application Serial No. PCT/US2012/022435, Written Opinion dated Aug. 31, 2012", 6 pgs.
"International Application Serial No. PCT/US2012/022439, International Preliminary Report on Patentability dated Aug. 8, 2013", 6 pgs.
"International Application Serial No. PCT/US2012/022439, Search Report dated Sep. 10, 2012", 3 pgs.
"International Application Serial No. PCT/US2012/022439, Written Opinion dated Sep. 10, 2012", 4 pgs.
"International Application Serial No. PCT/US2012/022441, International Preliminary Report on Patentability dated Aug. 8, 2013", 6 pgs.
"International Application Serial No. PCT/US2012/022441, Search Report dated Aug. 31, 2012", 3 pgs.
"International Application Serial No. PCT/US2012/022441, Written Opinion dated Aug. 31, 2012", 4 pgs.

(56) References Cited

OTHER PUBLICATIONS

"International Application Serial No. PCT/US2012/022441, Written Opinion dated Aug. 31, 2012", 3 pgs.

"International Application Serial No. PCT/US2012/022444, International Preliminary Report on Patentability dated Aug. 8, 2013", 5 pgs.

"International Application Serial No. PCT/US2012/022444, Search Report dated Aug. 31, 2012", 3 pgs.

"Japanese Application Serial No. 2013-514372 Response dated Nov. 4, 2014 to Non-Final Office Action dated Aug. 5, 2014", With the English claims, 19 pgs.

"Japanese Application Serial No. 2013-514372, Office Action dated Aug. 5, 2014", W/ English Translation, 12 pgs.

"Taiwan Application Serial No. 100120418 Response dated Nov. 11, 2014 to Non-Final Office Action dated Aug. 11, 2014", With the English claims, 46 pgs.

"Taiwanese Application Serial No. 100120418, Office Action dated Aug. 11, 2014", W/ English Translation, 6 pgs.

Badii, Atta, et al., "Efficient FPGA-based regular expression pattern matching", European and Mediterranean Conference on Information Systems A1 Bustan Rotana Hotel, [Online]. Retrieved from the Internet: <http://www.researchgate.net/publication/228810333_Efficient_FPGA_based_regular_expression_pattern_matching/file/9fcfd50e5e78229189.pdf>, (Mar. 25, 2008), 1-12.

Li, Lin, "On Algebraic Properties of State Machines", Masters Thesis—Guangxi Normal University, (Jan. 1, 2007), 31-34.

Mitra, Abhishek, et al., "Compiling PCRE to FPGA for Accelerating SNORT IDS", ACM/IEEE Symposium on Architectures for Networking and Communications Systems, (Dec. 2007), 9 pgs.

Sidhu, Reetinder, et al., "Fast Regular Expression Matching using FPGAs", IEEE Symposium on Field Programmable Custom Computing Machines (FCCM 2001), (Apr. 2001), 227-238.

Vasiliadis, Giorgos, et al., "Regular Expression Matching on Graphics Hardware for Intrusion Detection", Proceedings of the 12th International Symposium on Recent Advances in Intrusion Detection, See pp. 267-270, 272-274, (2009), 265-283.

Vassilios, Karakoidas, et al., "FIRE/J Optimizing Regular Expression Searches With Generative Programming", Software Practice & Experience, Wiley & Sons, vol. 38, No. 6, (Jul. 23, 2007), 557-573.

Yang, Yi-Hua E, et al., "Compact Architecture for High-Throughput regular expression matching on FPGA", Architectures for Networking and Communications Systems; 20081106-20081107, (Nov. 6, 2008), 30-39.

"U.S. Appl. No. 14/868,047, Non Final Office Action dated Oct. 20, 2016", 8 pgs.

"U.S. Appl. No. 15/049,943, Preliminary Amendment dated Feb. 23, 2016", 10 pgs.

"Korean Application Serial No. 10-2013-7000570, Response dated Aug. 22, 2016 to Office Action dated Jun. 21, 2016", W/ Machine Translation, 31 pgs.

"European Application Serial No. 11793185.7, Communication Pursuant to Article 94(3) EPC dated Jun. 20, 2016", 4 pgs.

"European Application Serial No. 11793185.7, Response dated Jan. 5, 2016 to Extended European Search Report dated Jul. 6, 2015", 18 pgs.

"Korean Application Serial No. 10-2013-7000570, Office Action dated Jun. 21, 2016", English Translation of Claims, 5 pgs.

"Korean Application Serial No. 10-2013-7000570, Preliminary Amendment dated Jun. 9, 2016", W/ English Claims, 32 pgs.

"U.S. Appl. No. 14/868,047, Response dated Jan. 23, 2017 to Non Final Office Action dated Oct. 20, 2016", 10 pgs.

"U.S. Appl. No. 14/868,047, Supplemental Response dated Jan. 25, 2017 to Non Final Office Action dated Oct. 20, 2016", 10 pgs.

"European Application Serial No. 11793185.7, Response dated Dec. 30, 2016 to Communication Pursuant to Article 94(3) EPC dated Jun. 20, 2016", 10 pgs.

* cited by examiner

ANALYZING DATA USING A HIERARCHICAL STRUCTURE

CLAIM OF PRIORITY

This patent application is a continuation of U.S. application Ser. No. 12/943,551, filed Nov. 10, 2010, which claims the benefit of priority, under 35 U.S.C. Section 119(e), to Dlugosch et al. U.S. Provisional patent application Ser. No. 61/353,546 entitled "HIERARCHICAL PATTERN RECOGNITION" filed on Jun. 10, 2010, both of which are hereby incorporated by reference herein in their entirety.

BACKGROUND

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

This document describes, among other things, methods and apparatuses for analyzing data using a hierarchical structure. The hierarchical structure can comprise a plurality of layers, where each layer performs an analysis on input data and provides an output based on the analysis. The output from lower layers in the hierarchical structure can be provided as inputs to higher layers. In this manner, lower layers can perform a lower level of analysis (e.g., more basic/fundamental analysis), while a higher layer can perform a higher level of analysis (e.g., more complex analysis) using the outputs from one or more lower layers. In an example, the hierarchical structure performs pattern recognition. In an example, pattern recognition includes identifying a sequence of symbols. Example symbols for identification of patterns can correspond to phonemes (audio), pixels in an image, ASCII characters, machine data (e.g., 0s and 1s).

In an example, the hierarchical structure is implemented with a plurality of parallel machines coupled together in a cascading manner. For example, a first and second parallel machine can be coupled in series such that the second parallel machine receives as an input, an output from the first parallel machine. Any number of parallel machines can be coupled together in this hierarchical structure.

In addition to analyzing data using a hierarchical structure, this document also describes methods and apparatuses for using information from the analysis performed at one level of a hierarchy to modify the analysis performed at another level of the hierarchy. Using the parallel machine example described above, the second parallel machine implementing a higher level of analysis can provide feedback information to the first parallel machine implementing a lower level of analysis. The feedback information can be used by the first parallel machine to update the analysis performed by the first parallel machine in a manner similar to learning in a biological brain.

Figure 1:
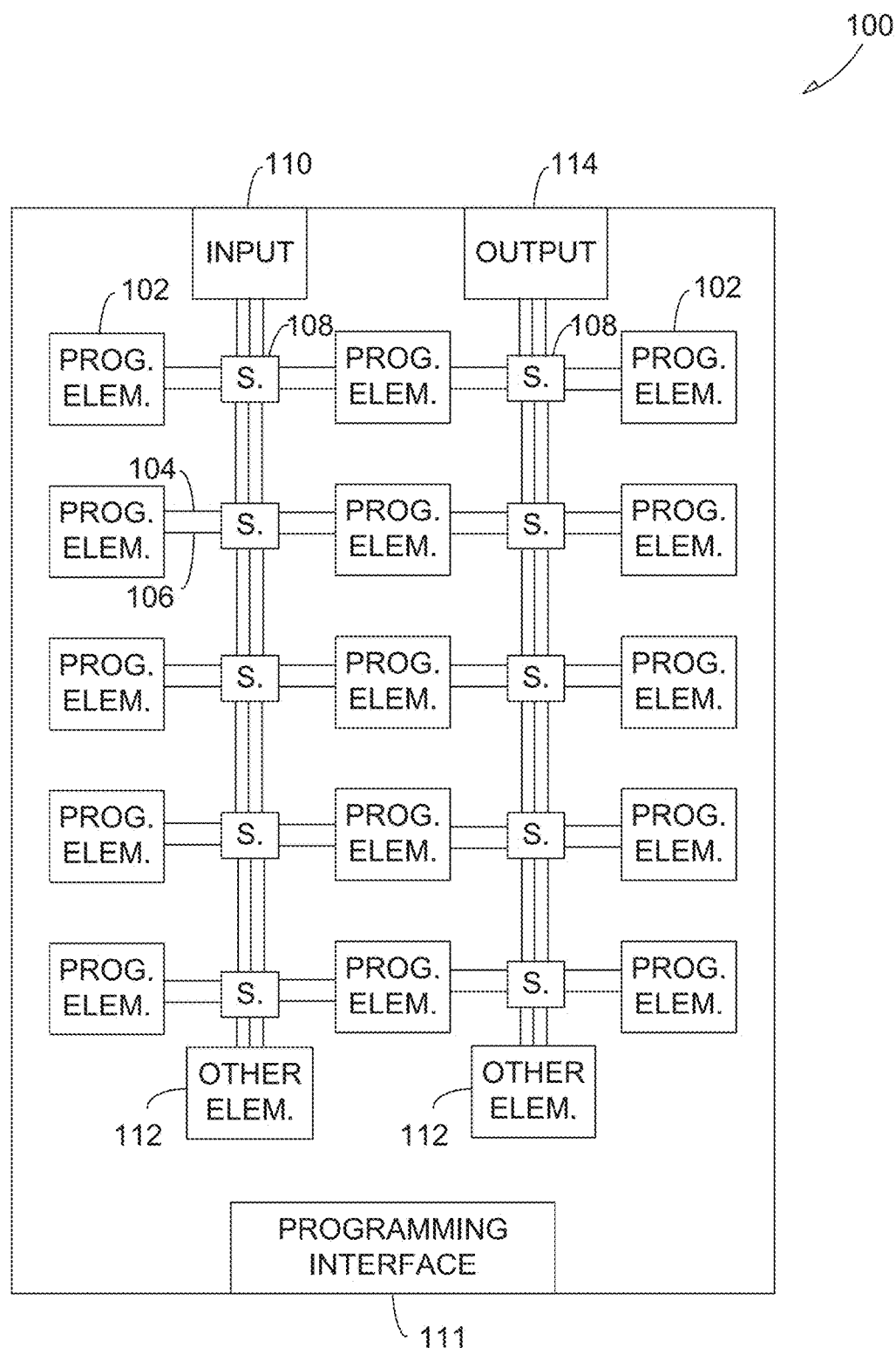
FIG. 1 illustrates an example of a parallel machine, according to various embodiments of the invention.

FIG. 1 illustrates an example parallel machine 100 that can be used to implement a hierarchical structure for analyzing data. The parallel machine 100 can receive input data and provide an output based on the input data. The parallel machine 100 can include a data input port 110 for receiving input data and an output port 114 for providing an output to another device. The data input port 110 provides an interface for data to be input to the parallel machine 100.

The parallel machine 100 includes a plurality of programmable elements 102 each having one or more inputs 104 and one or more outputs 106. A programmable element 102 can be programmed into one of a plurality of states. The state of the programmable element 102 determines what output(s) the programmable elements 102 will provide based on a given input(s). That is, the state of the programmable element 102 determines how the programmable element will react based on a given input. Data input to the data input port 110 can be provided to the plurality of programmable elements 102 to cause the programmable elements 102 to take action thereon. Examples of a programmable element 102 can include a state machine element (SME) discussed in detail below, and a configurable logic block. In an example, a SME can be set in a given state to provide a certain output (e.g., a high or "1" signal) when a given input is received at the data input port 110. When an input other than the given input is received at the data input port 110, the SME can provide a different output (e.g., a low or "0" signal). In an example, a configurable logic block can be set to perform a Boolean logic function (e.g., AND, OR, NOR, ext.) based on input received at the data input port 110.

The parallel machine 100 can also include a programming interface 111 for loading a program (e.g., an image) onto the parallel machine 100. The image can program (e.g., set) the state of the programmable elements 102. That is, the image can configure the programmable elements 102 to react in a certain way to a given input. For example, a programmable element 102 can be set to output a high signal when the character 'a' is received at the data input port 110. In some examples, the parallel machine 100 can use a clock signal for controlling the timing of operation of the programmable elements 102. In certain examples, the parallel machine 100 can include special purpose elements 112 (e.g., RAM, logic gates, counters, look-up tables, etc.) for interacting with the programmable elements 102, and for performing special purpose functions. In some embodiments, the data received at the data input port 110 can include a fixed set of data received over time or all at once, or a stream of data received over time. The data may be received from, or generated by, any source, such as databases, sensors, networks, etc, coupled to the parallel machine 100.

Figure 8:
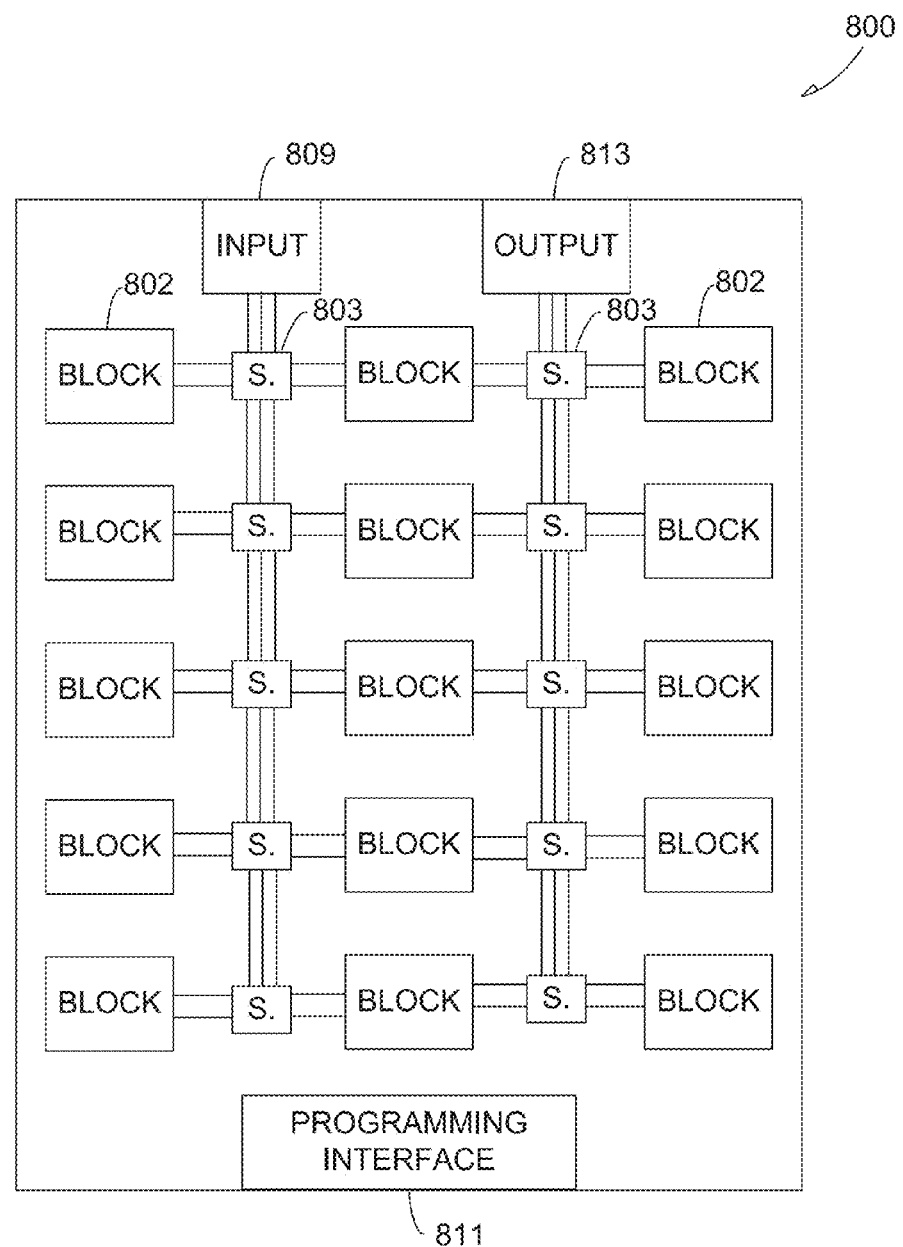
FIG. 8 illustrates an example of the parallel machine of FIG. 1 implemented as a finite state machine engine, according to various embodiments of the invention.

The parallel machine 100 also includes a plurality of programmable switches 108 for selectively coupling together different elements (e.g., programmable element 102, data input port 110, output port 114, programming interface 111, and special purpose elements 112) of the parallel machine 100. Accordingly, the parallel machine 100 comprises a programmable matrix formed among the elements. In an example, a programmable switch 108 can selectively couple two or more elements to one another such that an input 104 of a programmable element 102, the data input port 110, a programming interface 111, or special purpose element 112 can be coupled through one or more programmable switches 108 to an output 106 of a programmable element 102, the output port 114, a programming interface 111, or special purpose element 112. Thus, the routing of signals between the elements can be controlled by setting the programmable switches 108. Although FIG. 1 illustrates a certain number of conductors (e.g., wires) between a given element and a programmable switch 108, it should be understood that in other examples, a different number of conductors can be used. Also, although FIG. 1 illustrates each programmable element 102 individually coupled to a programmable switch 108, in other examples, multiple programmable elements 102 can be coupled as a group (e.g., a block 802, as illustrated in FIG. 8) to a programmable switch 108. In an example, the data input port 110, the data output port 114, and/or the programming interface 111 can be implemented as registers such that writing to the registers provides data to or from the respective elements.

In an example, a single parallel machine 100 is implemented on a physical device, however, in other examples two or more parallel machines 100 can be implemented on a single physical device (e.g., physical chip). In an example, each of multiple parallel machines 100 can include a distinct data input port 110, a distinct output port 114, a distinct programming interface 111, and a distinct set of programmable elements 102. Moreover, each set of programmable elements 102 can react (e.g., output a high or low signal) to data at their corresponding input data port 110. For example, a first set of programmable elements 102 corresponding to a first parallel machine 100 can react to the data at a first data input port 110 corresponding to the first parallel machine 100. A second set of programmable elements 102 corresponding to a second parallel machine 100 can react to a second data input port 110 corresponding to the second parallel machine 100. Accordingly, each parallel machine 100 includes a set of programmable elements 102, wherein different sets of programmable elements 102 can react to different input data. Similarly, each parallel machine 100, and each corresponding set of programmable elements 102 can provide a distinct output. In some examples, an output port 114 from first parallel machine 100 can be coupled to an input port 110 of a second parallel machine 100, such that input data for the second parallel machine 100 can include the output data from the first parallel machine 100.

In an example, an image for loading onto the parallel machine 100 comprises a plurality of bits of information for setting the state of the programmable elements 102, programming the programmable switches 108, and configuring the special purpose elements 112 within the parallel machine 100. In an example, the image can be loaded onto the parallel machine 100 to program the parallel machine 100 to provide a desired output based on certain inputs. The output port 114 can provide outputs from the parallel machine 100 based on the reaction of the programmable elements 102 to data at the data input port 110. An output from the output port 114 can include a single bit indicating a match of a given pattern, a word comprising a plurality of bits indicating matches and non-matches to a plurality of patterns, and a state vector corresponding to the state of all or certain programmable elements 102 at a given moment.

Example uses for the parallel machine 100 include, pattern-recognition (e.g., speech recognition, image recognition, etc.) signal processing, imaging, computer vision, cryptography, and others. In certain examples, the parallel machine 100 can comprise a finite state machine (FSM) engine, a field programmable gate array (FPGA), and variations thereof. Moreover, the parallel machine 100 may be a component in a larger device such as a computer, pager, cellular phone, personal organizer, portable audio player, network device (e.g., router, firewall, switch, or any combination thereof), control circuit, camera, etc.

Figure 2:
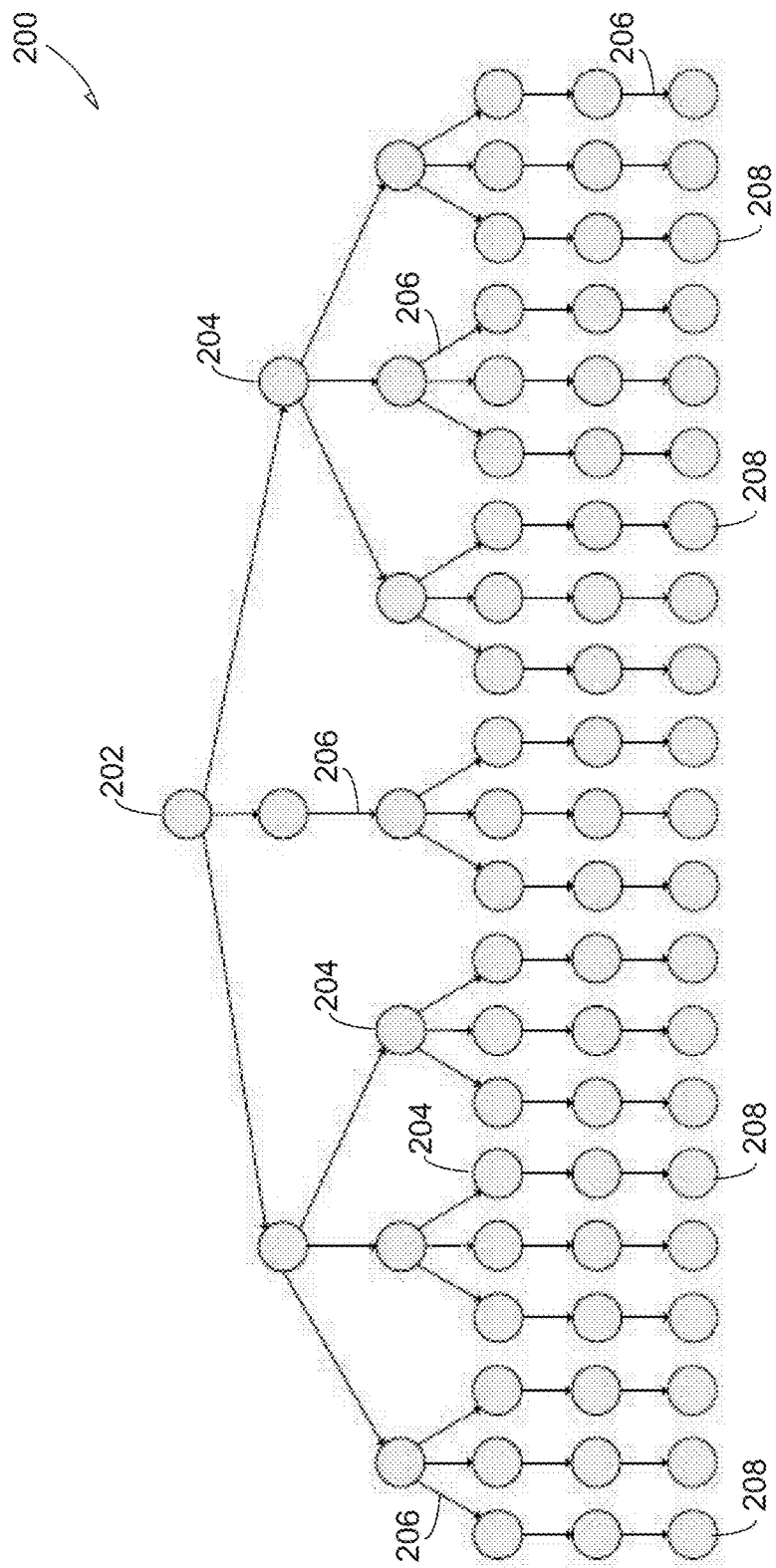
FIG. 2 illustrates an example of a finite state machine, according to various embodiments of the invention.

FIG. 2 illustrates an example model of a finite state machine (FSM) that can be implemented by the parallel machine 100. The parallel machine 100 can be configured (e.g., programmed) as a physical implementation of a FSM. A FSM can be represented as a graph 200, (e.g, directed graph, undirected graph, pseudograph), which contains one or more root nodes 202. In addition to the root nodes 202, the FSM can be made up of several standard nodes 204 and terminal nodes 208 that are connected to the root nodes 202 and other standard nodes 204 through one or more edges 206. A node 202, 204, 208 corresponds to a state in the FSM. The edges 206 correspond to the transitions between the states.

Each of the nodes (202, 204, 208) can be in either an active or an inactive state. When in the inactive state, a node (202, 204, 208) does not react (e.g., respond) to input data. When in an active state, a node (202, 204, 208) can react to input data. An upstream node (202, 204) can react to the input data by activating a node (204, 208) that is downstream from the node when the input data matches criteria specified by an edge 206 between the upstream node (202, 204) and the downstream node (204, 208). For example, a first node 204 that specifies the character 'b' will activate a second node 204 connected to the first node 204 by an edge 206 when the first node 204 is active and the character 'b' is received as input data. As used herein a "upstream" refers to a relationship between one or more nodes, where a first node that is upstream of one or more other nodes (or upstream of itself in the case of loop) refers to the situation in which the first node can activate the one or more other nodes (or can activate itself in the case of a loop). Similarly, "downstream" refers to a relationship where a first node that is downstream of one or more other nodes (of downstream of itself in the case of a loop) can be activated by the one or more other node (or can be activated by itself in the case of a loop. Accordingly, the terms "upstream" and "downstream" are used herein to refer to relationships between one or more nodes, but these terms do not preclude the use of loops or other non-linear paths among the nodes.

In the graph 200, the root node 202 can be initially activated and can activate downstream nodes 204, 208 when the input data matches an edge 206 from the root node 202. Nodes 204, 208 throughout the graph 200 can be activated in this manner as the input data is received. A terminal node 208 corresponds to a match of a sequence of interest by the input data. Accordingly, activation of a terminal node 208 indicates that a sequence of interest has been received as the input data. In the context of the parallel machine 100 implementing a pattern recognition function, arriving at a terminal node 208 can indicate that a specific pattern of interest has been detected in the input data.

In an example, each root node 202, standard node 204, and terminal node 208 can correspond to a programmable element 102 in the parallel machine 100. Each edge 206 can correspond to connections between the programmable elements 102. Thus, a standard node 204 that transitions to (e.g., has an edge 206 connecting to) another standard node 204 or a terminal node 208 corresponds to a programmable element 102 that transitions to (e.g., provides an output to) another programmable element 102. In some examples, the root node 202 does not have a corresponding programmable element 102.

When the parallel machine 100 is programmed as a FSM, each of the programmable elements 102 can also be in either an active or inactive state. A given programmable element 102 when inactive does not react to the input data at its corresponding data input port 110. An active programmable element 102 can react to the input data and the data input port 110, and can activate a downstream programmable element 102 when the input data matches the setting of the programmable element 102. When a programmable element 102 corresponds to a terminal node 208, the programmable element 102 can be coupled to the output port 114 to provide an indication of a match to an external device.

An image loaded onto the parallel machine 100 via the programming interface 111 can configure the programmable elements 102 and other elements 112, as well as the connections between the programmable elements 102 and other elements 112 such that a desired FSM is implemented through the sequential activation of nodes based on reactions to the data at the data input port 110. In an example, a programmable element 102 remains active for a single data cycle (e.g., a single character, a set of characters, a single clock cycle) and then switches to inactive unless re-activated by an upstream programmable element 102.

A terminal node 208 can be considered to store a compressed history of past events. For example, the one or more patterns of input data required to reach a terminal node 208 can be represented by the activation of that terminal node 208. In an example, the output provided by a terminal node 208 is binary, that is, the output indicates whether the pattern of interest has been matched or not. The ratio of terminal nodes 208 to standard nodes 204 in a graph 200 may be quite small. In other words, although there may be a high complexity in the FSM, the output of the FSM may be small by comparison.

In an example, the output of the parallel machine 100 can comprise a state vector for a parallel machine. The state vector comprises the state (e.g., activated or not activated) of programmable elements 102 of the parallel machine 100. In an example, the state vector includes the states for the programmable elements 102 corresponding to terminal nodes 208. Thus, the output can include a collection of the indications provided by all terminal nodes 208 of a graph 200. The state vector can be represented as a word, where the binary indication provided by each terminal node 208 comprises one bit of the word. This encoding of the terminal nodes 208 can provide an effective indication of the detection state (e.g., whether and what sequences of interest have been detected) for the parallel machine 100. In another example, the state vector can include the state of all or a subset of the programmable elements 102 whether or not the programmable elements 102 corresponds to a terminal node 208.

As mentioned above, the parallel machine 100 can be programmed to implement a pattern recognition function. For example, the FSM implemented by the parallel machine 100 can be configured to recognize one or more data sequences (e.g., signatures, patterns) in the input data. When a data sequence of interest is recognized by the parallel machine 100, an indication of that recognition can be provided at the output port 114. In an example, the pattern recognition can recognize a string of symbols (e.g., ASCII characters) to; for example, identify malware or other information in network data.

Figure 3:
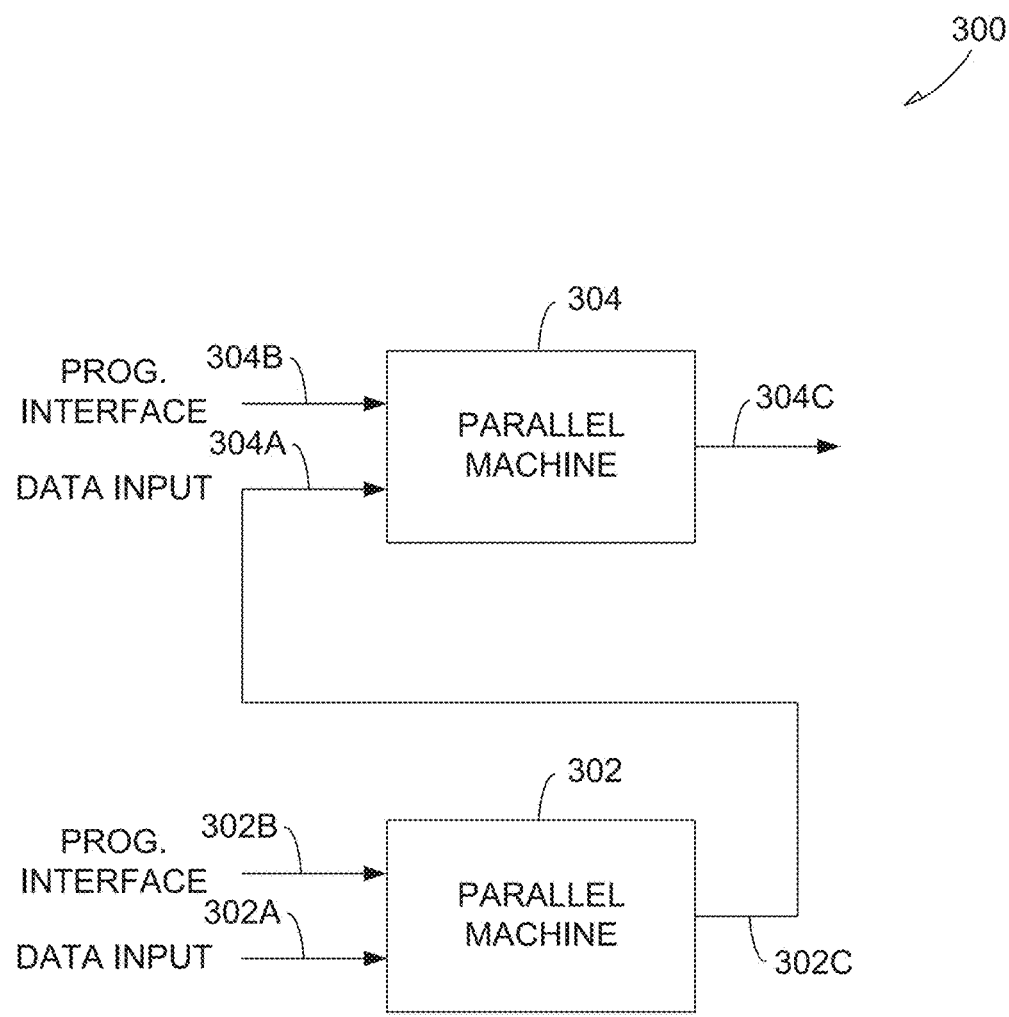
FIG. 3 illustrates an example of two-level hierarchy implemented with parallel machines, according to various embodiments of the invention.

FIG. 3 illustrates an example of a first parallel machine 302 and a second parallel machine 304 configured to analyze data using a hierarchical structure 300. Each parallel machine 302, 304 includes a data input port 302A, 304A, a programming interface 302B, 304B, and an output port 302C, 304C.

The first parallel machine 302 is configured to receive input data, for example, raw data at the data input port 302A. The first parallel machine 302 responds to the input data as described above and provides an output at the output port 302C. The output from the first parallel machine 302 is sent to the data input port 304A of the second parallel machine 304. The second parallel machine 304 can then react based on the output provided by the first parallel machine 302 and provide a corresponding output at output port 304C. This hierarchical coupling of two parallel machines 302, 304 in series provides a means to transfer information regarding past events in a compressed word from a first parallel machine 302 to a second parallel machine 304. The information transferred can effectively be a summary of complex events (e.g., sequences of interest) that were recorded by the first parallel machine 302.

The two-level hierarchy 300 of parallel machines 302, 304 shown in FIG. 3 allows two independent programs to operate based on the same data stream. The two stage hierarchy can be similar to visual recognition in a biological brain which is modeled as different regions. Under this model, the regions are effectively different pattern recognition engines, each performing a similar computational function (pattern matching) but using different programs (signatures). By connecting multiple parallel machines 302, 304 together increased knowledge about the data stream input may be obtained.

The first level of the hierarchy (implemented by the first parallel machine 302) performs processing directly on a raw data stream. That is, the raw data stream is received at the input interface 302A and the programmable elements of the first parallel machine 302 can react to the raw data stream. The second level (implemented by the second parallel machine 304) of the hierarchy processes the output from the first level. That is, the second parallel machine 304 receives the output from the first parallel machine 302 at the input interface 304B and the programmable elements of the second parallel machine 304 can react to the output of the first parallel machine 302. Accordingly, in this example, the second parallel machine 304 does not receive the raw data stream as an input, but rather receives the indications of patterns of interest that are matched by the raw data stream as determined by the first parallel machine 302. The second parallel machine 304 can be programmed with a FSM that recognizes patterns in the output data stream from the first parallel machine 302.

Figure 4:
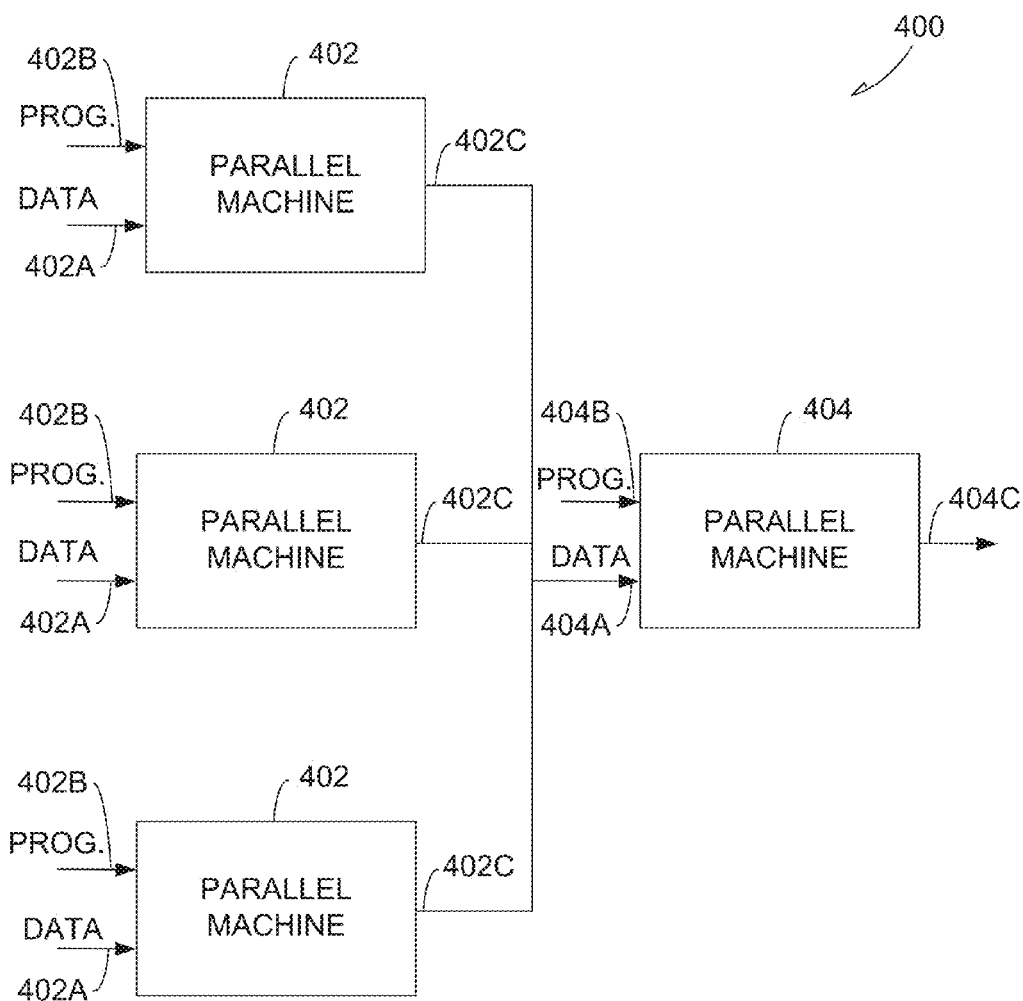
FIG. 4 illustrates another example of a two-level hierarchy implemented with parallel machines, according to various embodiments of the invention.

FIG. 4 illustrates another example of a two-level hierarchy 400, where one level of the hierarchy is implemented with multiple parallel machines. Here, the first level of the hierarchy 400 is implemented with three parallel machines 402. The output from each of the three first level parallel machines 402 is provided to a single second level parallel machine 404 that recognizes (e.g., identifies) patterns in the outputs from the first level parallel machines 402. In other examples, different numbers of parallel machines can be implemented at different levels. Each parallel machine 402, 404 includes a data input port 402A, 404A, a programming interface 402B, 404B, and an output port 402C, 404C.

Figure 5:
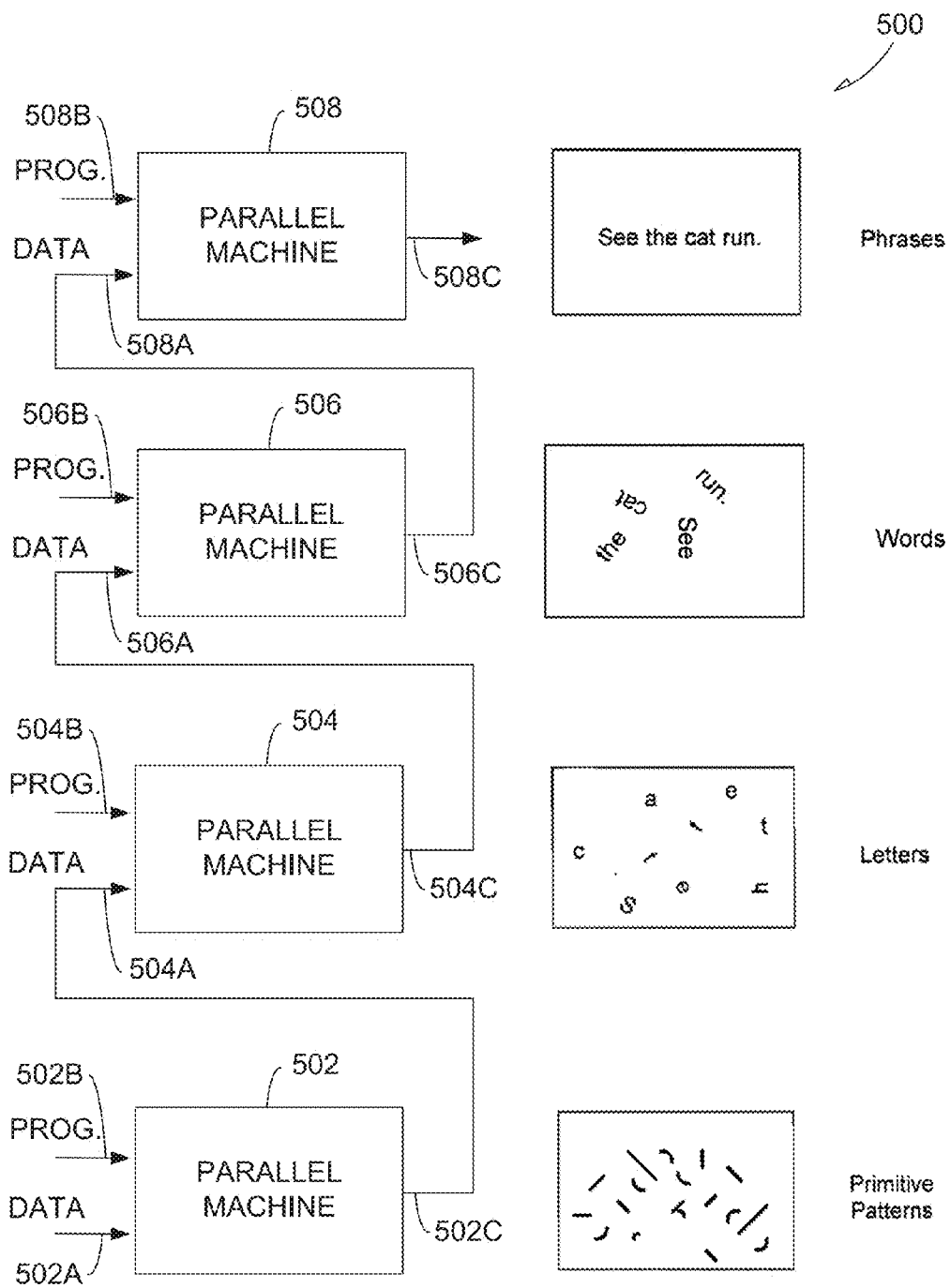
FIG. 5 illustrates an example of a four-level hierarchy implemented with parallel machines, according to various embodiments of the invention.

FIG. 5 illustrates a four-level hierarchy 500 implemented with four parallel machines 502, 504, 506, and 508, and showing an example of patterns to be identified by each level. As discussed above each parallel machine 502, 504, 506, and 508 includes a data input port 502A, 504A, 506A, and 508A, a programming interface 502B, 504B, 506B, and 508B, and an output port 502C, 504C, 506C, and 508C. The four-level hierarchy 500 corresponds to a visual identification of written language based on black or white pixels in an image. As the hierarchy progresses to higher levels, the accumulated knowledge of the input stream grows correspondingly. The parallel machines 502, 504, 506, 508 are cascaded to accomplish hierarchical recognition capability. Each successive level of the hierarchy 500 can implement new rules (pattern signatures) that are applied to the compressed output of the previous level. In this way, highly detailed objects can be identified based on the initial detection of basic primitive information.

For example, the raw data input stream to level one (the first parallel machine 502) can comprise pixel information (e.g., whether a given bit is black/white, ON/OFF) for a visual image. The first parallel machine 502 can be programmed to identify primitive patterns formed by the pixel information. For example, the first parallel machine 502 can be configured to identify when adjacent pixels form vertical lines, horizontal lines, arcs, etc. Each of these patterns (e.g., vertical line, horizontal line arc, etc.) can be indicated by a respective output bit (or signal) from the first parallel machine 502. For example, when the first parallel machine 502 identifies a vertical line of at least 3 bits, a high signal (e.g., logical '1') can be output on a first bit of an output word to the second parallel machine 504. When the first parallel machine 502 identifies a horizontal line of at least 3 bits, a high signal can be output on a second bit of an output word to the second parallel machine 504.

The second level (the second parallel machine 504) can be programmed to identify patterns in the output signal from the first parallel machine 502. For example, the second parallel machine 502 can be programmed to identify patterns formed by combinations of the primitive patterns (lines, arcs, etc.) identified by the first parallel machine 502. The second parallel machine 504 can be programmed to identify when a horizontal line and a vertical line cross forming the letter "t". As mentioned above, the nodes in the FSM implemented by the second parallel machine 504 react to the output from the first parallel machine 502. Thus, the combinations of the primitive patterns are identified by identifying patterns in the output bits from the first parallel machine 502.

The output from the second parallel machine 504 is then input into the third level (the third parallel machine 506) which can identify words from combinations of the letters identified by the second parallel machine 506. The fourth level (the fourth parallel machine 508) can then identify phrases formed by the words identified by the third parallel machine 506. Accordingly, higher levels can be programmed to identify patterns in the lower level outputs. Additionally, lower levels can be programmed to identify components that make up the patterns identified in the higher level.

The visual identification of letters, words, and phrases from pixel information is used as an example; however, the hierarchical methods and apparatuses described herein can be applied to other data and for other uses. For example, hierarchical analysis can be used on data corresponding to sounds to identify syllables from combinations of phonemes at a first level and words from combinations of syllables at a second level. In other examples, the hierarchical analysis can be applied to machine data (e.g., raw 0s and 1s) that builds upon itself in a hierarchal manner.

Although FIG. 5 illustrates specific and individual connections between layers, it should be understood that a hierarchy can be implemented in which the output from one level is fed forward or back to other levels of the hierarchy. For instance, an output from the second parallel machine 504 could be sent to the fourth parallel machine 508, while an output from the fourth parallel machine 508 might be fed back to the third parallel machine 506. In general terms, a hierarchy can be implemented such that detection state information from parallel machines is fed to one or more or all of the other parallel machines.

In some examples, feedback is used in the hierarchical structure to update the program used by one or more levels. For example, an output from a first level can be provided to a second level to reprogram the second level. This can be used to update the rules applied by the second level based on patterns identified (or not identified) in the first level. In an example, the first level is a higher level in the hierarchy than the second level. The lower level, for example, can be reprogrammed to look for additional patterns not originally specified by the program based on the patterns identified by the higher level. In another example, the lower level can be notified that a particular pattern identified by the lower level is significant in that the particular pattern combines with other patterns to form a significant event. In yet another example, the lower level may be notified that a particular pattern identified has no particular value and, as such, the lower level can stop identifying that pattern. In an example, the reprogramming can be performed over time, such that the program for a given level is incrementally modified by small adjustments over a period of time.

Figure 6:
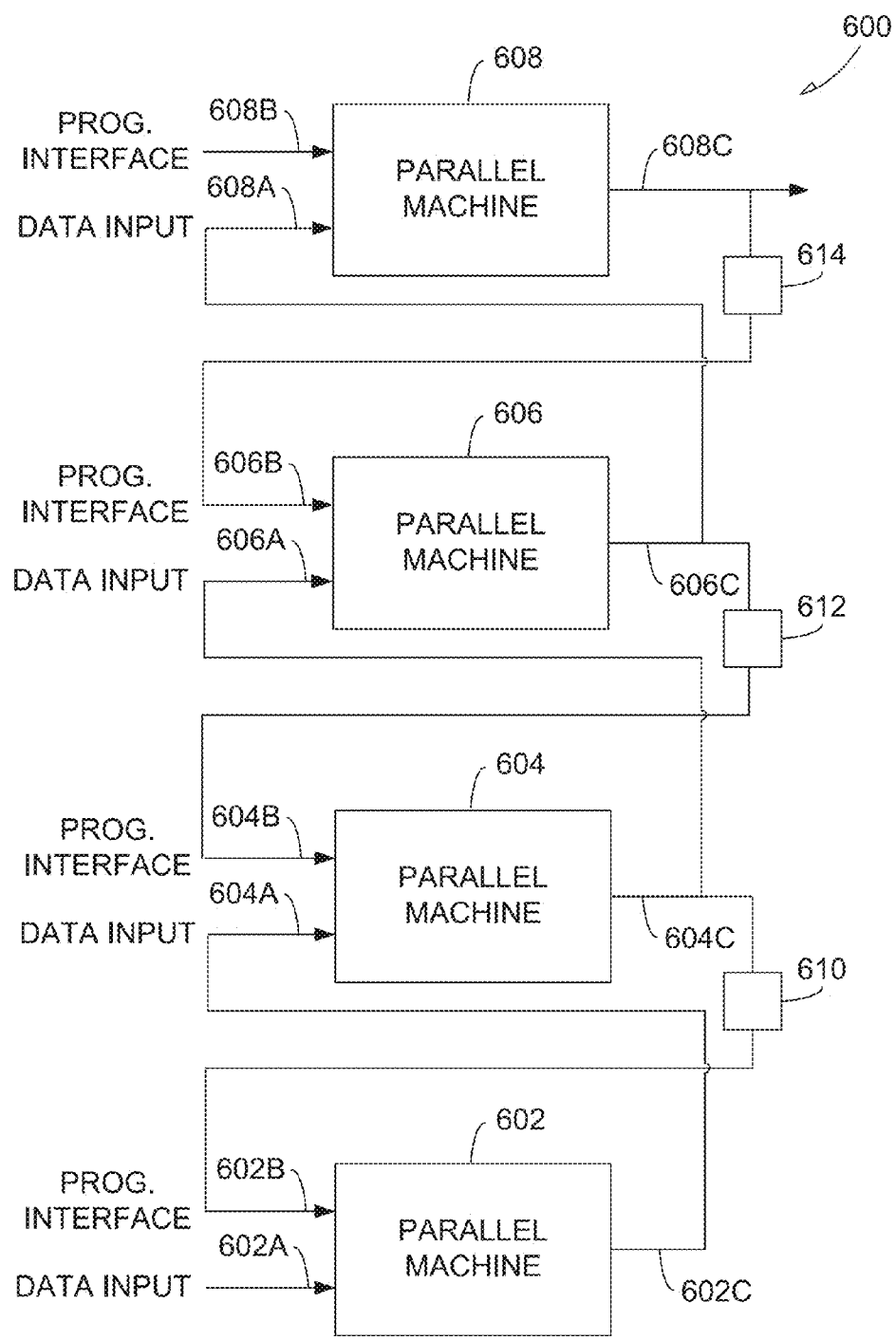
FIG. 6 illustrates an example of a four-level hierarchy having feedback implemented with parallel machines, according to various embodiments of the invention.

FIG. 6 illustrates an example of a four-level hierarchy 600 that uses feedback to reprogram portions of the hierarchy. The four-level hierarchy 600 is implemented with four parallel machines 602, 604, 606, 608 which each have a data input port 602A, 604A, 606A, 608A, a programming interface 602B, 604B, 606C, 608B, and an output port 602C, 604C, 606C, 608C. The first parallel machine 602 implements the first level of the hierarchy 600 and provides an output to the second parallel machine 604 which implements the second level of the hierarchy 600. The third and fourth parallel machines 606, 608 likewise implement the third and fourth levels of the hierarchy 600. In an example, the output from the fourth parallel machine 608 is sent to an external device as an output of the hierarchy 600 based on analysis of the hierarchy 600 on the input data received by the first parallel machine 602. Accordingly, the output from the fourth parallel machine 608 corresponds to the collective output for the hierarchy 600. In other examples, the output from other parallel machines 608 can correspond to the collective output for the hierarchy 600.

The outputs from the second, third, and fourth parallel machines 604, 606, 608 are each fed back to the programming interface 602B, 604B, 606B of the parallel machine 602, 604, 606 at the level below. For example, the output from the fourth parallel machine 608 is fed back into the programming interface 606B of the third parallel machine 606. The third parallel machine 606, therefore, can be reprogrammed based on the output from the fourth parallel machine 608. Accordingly, the third parallel machine 608 can modify its program during runtime. The first and second parallel machines 602, 604 can be similarly reprogrammed during runtime based on the outputs from the second and third parallel machines 604, 606 respectively.

In example, the feedback from a parallel machine 604, 606, 608 is analyzed and compiled to form a program (e.g., an image) for reprogramming a parallel machine 602, 604, 606. For example, the output from the parallel machine 408 is analyzed and compiled by a processing device 614 before being sent to the programming interface 606B. The processing device 614 can generate the updated program for the parallel machine 606 based on the output from the parallel machine 608. The processing device 614 can analyze the output and compile the updated program for the third parallel machine 606. The updated program can then be loaded onto the third parallel machine 606 through the programming interface 606B to reprogram the third parallel machine 606. In an example, the updated program may contain only a partial change from the current program. Thus, in an example, an updated program replaces only a portion of a current program on a parallel machine 602, 604, 606, 608. In another example, an updated program replaces all or a large portion of a current program. Likewise, the processing devices 610, 612 can analyze the feedback and compile the updated program in a similar manner based on the outputs from the second and third parallel machines 604, 606. A processing device 610, 612, 614 can be implemented with one or more additional parallel machines, or can be implemented with a different type of machine (e.g., a computer having a von Neumann architecture).

In some examples, the processing device 610, 612, 614 analyzes the output from a higher level prior to compiling the new program. In an example, the processing device 610, 612, 614 analyses the output to determine how to update the lower level program and then compiles the new (e.g., updated, original) lower level program based on the analysis. Although in the hierarchy 600, the feedback at a given parallel machine is received from the level directly above the given parallel machine, feedback can be from any parallel machine to another parallel machine at a higher, lower, or the same level. For example, feedback can be received at a programming input of a parallel machine from the output of that same parallel machine, or from the output of another parallel machine at the same, higher, or lower levels. Additionally, a parallel machine can receive feedback from multiple different parallel machines. The reprogramming of parallel machines based on feedback may be disconnected in time from the identification of patterns in the input data (e.g., not real time with the processing of the raw data).

A purpose of sending information back down the hierarchy to affect reprogramming of the lower levels can be so that the lower levels may become more efficient at discerning patterns of interest. Another purpose for sending information down the hierarchy is to achieve a higher level of acuity in the lower levels. In some examples, the process of sending information to higher levels is avoided when possible, recognizing that it takes time to transfer information to higher levels of the hierarchy. In some examples, the higher levels can be essentially used to resolve the identification of patterns that are new to the system. This can be similar to the process used that takes place in the neocortex of a biological brain. In an example, if a pattern can be fully resolved at the lower levels, it should be. The feedback mechanism is one method to transfer "learning" to the lower levels of the hierarchy. This process of pushing information back down the hierarchy will help preserve the upper levels of the hierarchy for processing new or unfamiliar patterns.

Furthermore, the entire recognition process can speed up by reducing the amount of data transfer through various levels of the hierarchy.

The feedback can make the lower levels of the hierarchy more acutely sensitive to the data stream at the input. A consequence of this "push down" of information is that decisions can be made at the lower levels of the hierarchy and can be done so quickly. Accordingly, in an example, the output from lower level parallel machines (e.g., the first parallel machine 602) can correspond to the collective output from the hierarchy 600 to another device along with the output from the fourth parallel machine 608. The external device can, for example, monitor the output from each of these parallel machines 602, 608 to determine when patterns have been identified by the hierarchy 600.

In an example, the feedback information can include identifying information corresponding to the data stream analyzed. For example, the identifying information can include an identifying characteristic of the data, format of the data, a protocol of the data, and/or any other type of identifying information. The identifying information may be collected, analyzed, and used to modify (e.g., adapt) the analysis method for the input data by, for example the processing device 610. A parallel machine 100 may then be programmed with the adapted analysis method. The identifying information can include, for example, a language of the input data. The parallel machine 100 can be initially programmed to determine a language of the input data and may be adapted (e.g., reprogrammed) during runtime once a language has been identified corresponding to the input. The adapted analysis method for the parallel machine 100 can correspond more specifically to analysis methods for the identified language. Finally, the parallel machine 100 may analyze future input data using the adapted analysis method. The feedback process may be iterative, so that additional identifying information may be found in the input data to allow for further adaptation of the analysis method.

Figure 12:
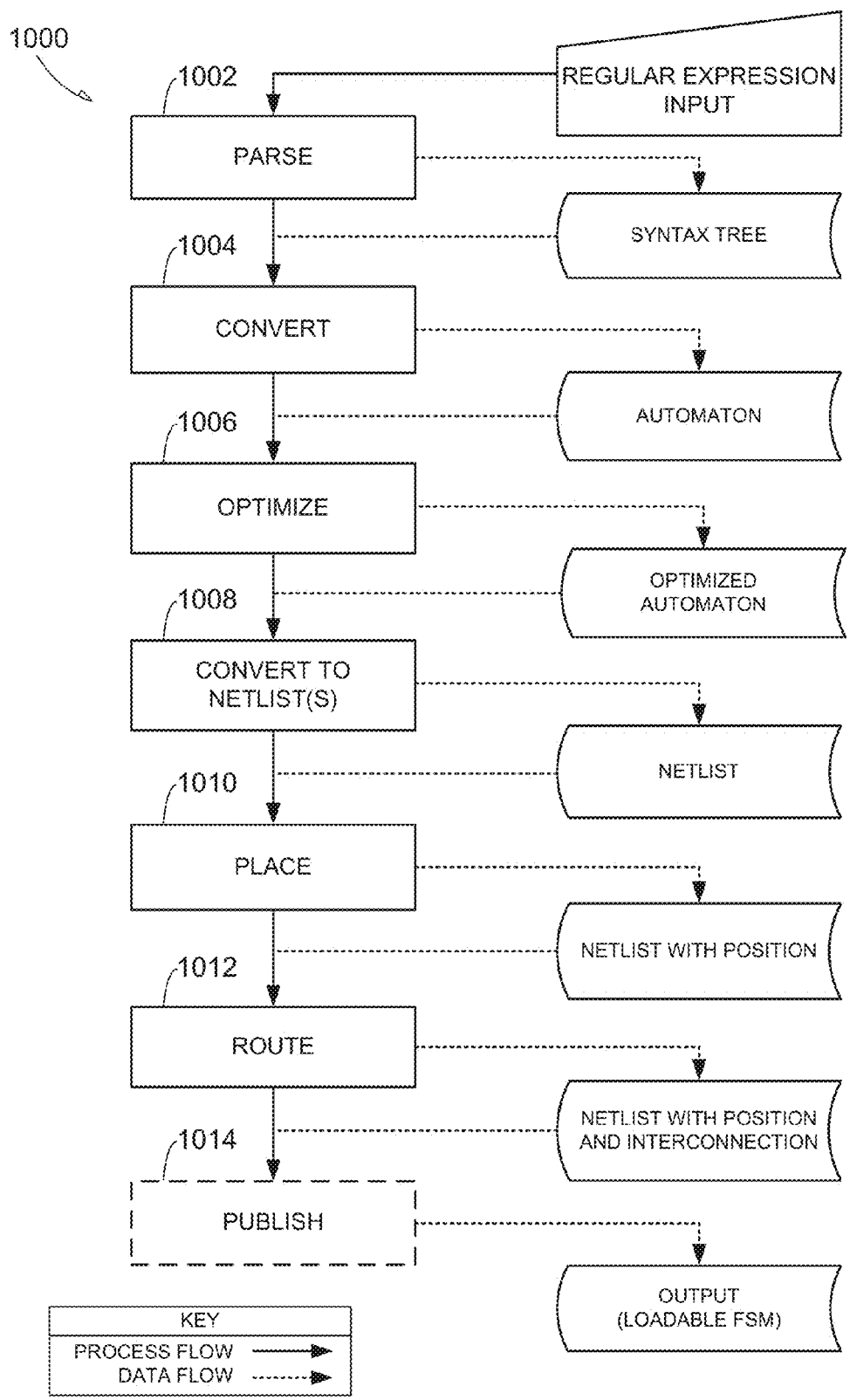
FIG. 12 illustrates an example of a method for a compiler to convert source code into an image for programming of the parallel machine of FIG. 8, according to various embodiments of the invention.

Programs (e.g., images) for loading onto a parallel machine 100 can be generated by a compiler as discussed below with respect to FIG. 12. In general, compiling can be a computationally intensive process, and can be most apparent when compiling large databases of pattern signatures for the first time. In runtime operation, parallel machines 100 of higher levels can be providing feedback to the lower levels in the form of an incremental program update for the lower level parallel machine. Thus, the feedback information to the lower level parallel machine can be much smaller, incremental updates to an original program that are less computationally intensive to compile.

Figure 7:
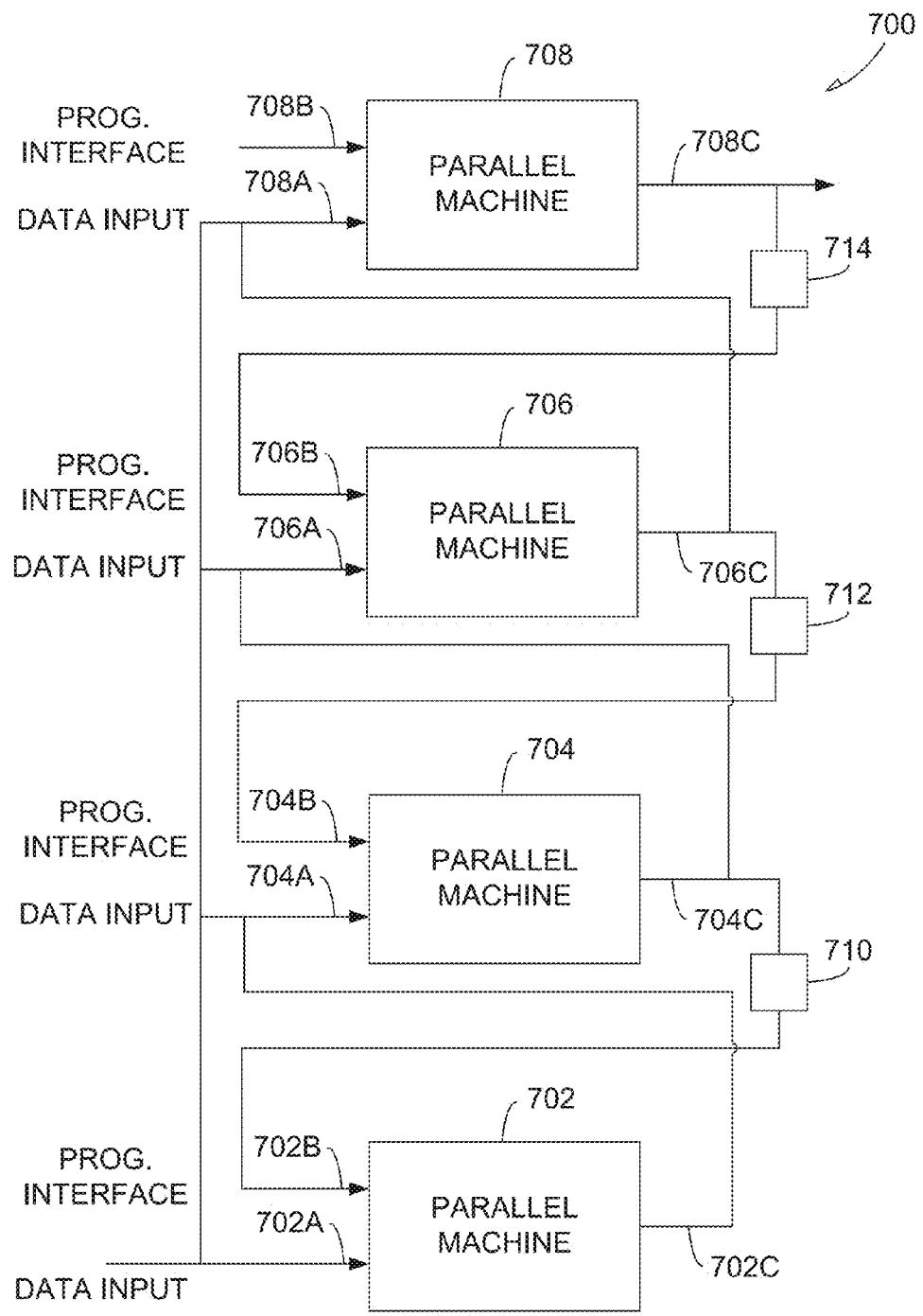
FIG. 7 illustrates another example of a four-level hierarchy having feedback implemented with parallel machines, according to various embodiments of the invention.

FIG. 7 illustrates another example of a four-level hierarchy 700 implemented with four parallel machines 702, 704, 706, 708. The four parallel machines 702, 704, 706, 708 which each have a data input port 702A, 704A, 706A, 708A, a programming interface 702B, 704B, 706C, 708B, and an output port 702C, 704C, 706C, 708C. Additionally, in some examples, the four-level hierarchy 700 can include processing devices 710, 712, 714 to compile programs for the parallel machines 702, 704, and 706. In the four-level hierarchy 700, the second, third, and fourth level parallel machines 704, 706, 708 receive input data from outputs of lower level parallel machines 702, 704, 706 as well as the input data from the raw data stream. Accordingly, the levels two, three, and four can identify patterns from combinations of the patterns from lower levels and the raw data.

As can be seen from FIGS. 6 and 7, parallel machines 100 can be cascaded in almost any manner where the raw data input to the hierarchy as well as an output from a parallel machine 100 can be sent to any other parallel machine 100 including itself. Moreover, the outputs from a given parallel machine 100 can be sent to another parallel machine 100 as input data in to the data input port 110 and/or as feedback for updating the program for a parallel machine 100.

Due to the time for a parallel machine 100 to process one data cycle (e.g., a bit, a word) of input data, cascading parallel machines 100 in series can increase the time to fully process the input data stream through all the parallel machines 100 to generate a collective output for a hierarchy. Since the lower level of a hierarchy can receive a lower (most granular) level of input, the lower levels should be expected to be more active than the output of high levels. That is, each successive level in the hierarchy can assemble higher level objects. In an example, a parallel machine 100 has a maximum input rate that limits how fast input data can be fed to the parallel machine 100. This input rate can be thought of as a single data cycle. On each successive data cycle the parallel machine 100 has the potential to activate many terminal nodes. This could cause a parallel machine 100 (especially at the lower levels of a hierarchy) to produce a significant amount of output data. For example, if the input is provided as stream of bytes to the lowest level parallel machine 100, on any given data cycle it may be possible for the parallel machine 100 to generate multiple bytes of result information. If one byte of information can generate multiple bytes of information, then the entire hierarchy of parallel machines 100 should be synchronized so that information is passed up the hierarchy. In some examples, the feedback does not need to be synchronized. The faster the feedback is received at a lower level, however, the faster the lower level can adapt, and the more efficient the analysis.

As an example, a maximum size output for each level of the hierarchy (implemented with a single parallel machine 100) can equal 1024 bytes and a depth of the hierarchy can equal 4 levels. The input data stream data rate for a parallel machine 100 can equal 128 MB/second. With these conditions each level of the hierarchy could be traversed in 7.63 microseconds. With a four level hierarchy, the total settling time of the entire stack of parallel machines 100 would be 4 times 7.63 microseconds or 30.5 microseconds. With a 30.5 microsecond settling time, the implication is that the input data frequency should be limited to 32 KB/s.

Notably, this is highly dependent on the configuration of the parallel machines 100. Parallel machines 100 can be configurable to tradeoff input data rates vs. the state machine size. In addition, the input word size to a parallel machine can be adjusted if corresponding modifications are made to the compiler that produced the individual images loaded onto the parallel machines 100.

In an example, the hierarchical structure described above could be implemented with software on machine having a von Neumann architecture. Accordingly, software instructions could cause a processor to implement a first level analysis FSM on raw data. The output from the first level FSM could then be processed by the processor using a second level analysis and so on. Moreover, the feedback loop discussed above could be implemented such that the first level analysis is modified based on, for example, the output of the second level analysis.

FIGS. 8-11 illustrate an example of a parallel machine referred to herein as "FSM engine 800". In an example, the FSM engine 800 comprises a hardware implementation of a finite state machine. Accordingly, the FSM engine 800 implements a plurality of selectively coupleable hardware elements (e.g., programmable elements) that correspond to a plurality of states in a FSM. Similar to a state in a FSM, a hardware element can analyze an input stream and activate a downstream hardware element based on the input stream.

The FSM engine 800 includes a plurality of programmable elements including general purpose elements and special purpose elements. The general purpose elements can be programmed to implement many different functions. These general purpose elements include SMEs 804, 805 (shown in FIG. 11) that are hierarchically organized into rows 806 (shown in FIGS. 9 and 10) and blocks 802 (shown in FIGS. 8 and 9). To route signals between the hierarchically organized SMEs 804, 805, a hierarchy of programmable switches is used including inter-block switches 803 (shown in FIGS. 8 and 9), intra-block switches 808 (shown in FIGS. 9 and 10) and intra-row switches 812 (shown in FIG. 10). A SME 804, 805 can correspond to a state of a FSM implemented by the FSM engine 800. The SMEs 804, 805 can be coupled together by using the programmable switches as described below. Accordingly, a FSM can be implemented on the FSM engine 800 by programming the SMEs 804, 805 to correspond to the functions of states and by selectively coupling together the SMEs 804, 805 to correspond to the transitions between states in the FSM.

FIG. 8 illustrates an overall view of an example FSM engine 800. The FSM engine 800 includes a plurality of blocks 802 that can be selectively coupled together with programmable inter-block switches 803. Additionally, the blocks 802 can be selectively coupled to an input block 809 (e.g., a data input port) for receiving signals (e.g., data) and providing the data to the blocks 802. The blocks 802 can also be selectively coupled to an output block 813 (e.g., an output port) for providing signals from the blocks 802 to an external device (e.g., another FSM engine 800). The FSM engine 800 can also include a programming interface 811 to load a program (e.g., an image) onto the FSM engine 800. The image can program (e.g., set) the state of the SMEs 804, 805.

That is, the image can configure the SMEs 804, 805 to react in a certain way to a given input at the input block 809. For example, a SME 804 can be set to output a high signal when the character 'a' is received at the input block 809.

In an example, the input block 809, the output block 813, and/or the programming interface 811 can be implemented as registers such that writing to the registers provides data to or from the respective elements. Accordingly, bits from the image stored in the registers corresponding to the programming interface 811 can be loaded on the SMEs 804, 805. Although FIG. 8 illustrates a certain number of conductors (e.g., wire, trace) between a block 802, input block 809, output block 813, and an inter-block switch 803, it should be understood that in other examples, fewer or more conductors can be used.

Figure 9:
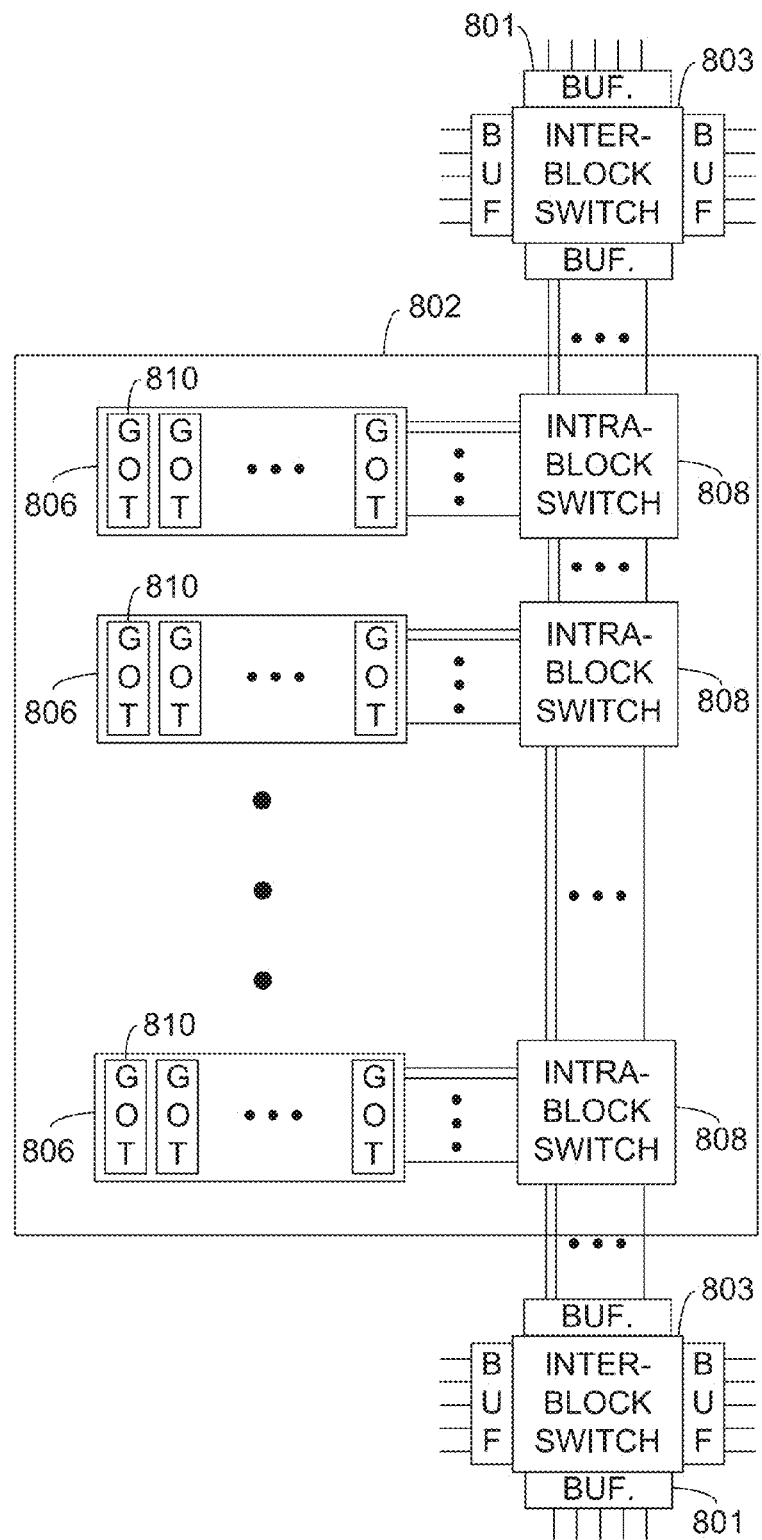
FIG. 9 illustrates an example of a block of the finite state machine engine of FIG. 8, according to various embodiments of the invention.

FIG. 9 illustrates an example of a block 802. A block 802 can include a plurality of rows 806 that can be selectively coupled together with programmable intra-block switches 808. Additionally, a row 806 can be selectively coupled to another row 806 within another block 802 with the inter-block switches 803. In an example, buffers 801 are included to control the timing of signals to/from the inter-block switches 803. A row 806 includes a plurality of SMEs 804, 805 organized into pairs of elements that are referred to herein as groups of two (GOTs) 810. In an example, a block 802 comprises sixteen (16) rows 806.

Figure 10:
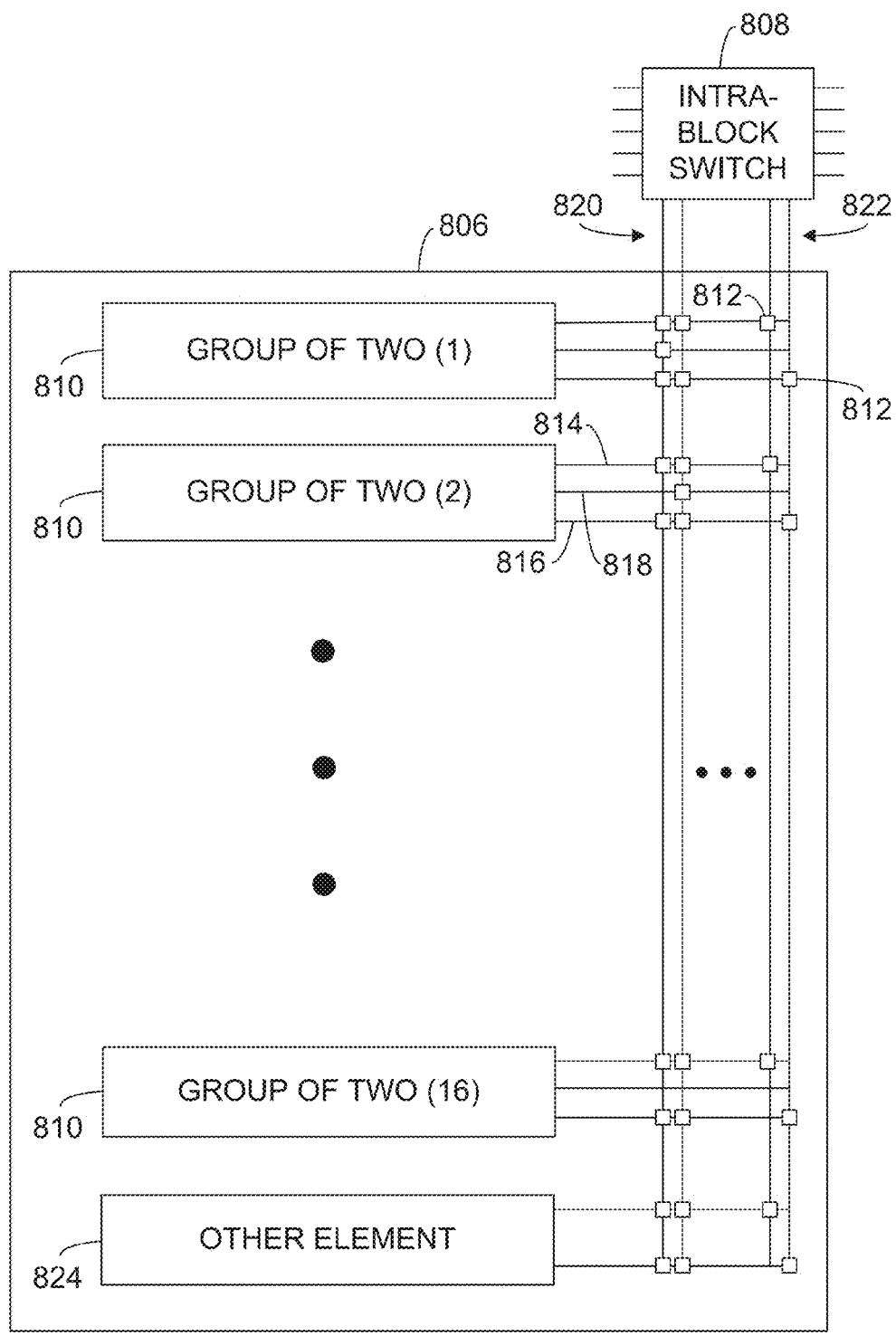
FIG. 10 illustrates an example of a row of the block of FIG. 9, according to various embodiments of the invention.

FIG. 10 illustrates an example of a row 806. A GOT 810 can be selectively coupled to other GOTs 810 and any other elements 824 within the row 806 by programmable intra-row switches 812. A GOT 810 can also be coupled to other GOTs 810 in other rows 806 with the intra-block switch 808, or other GOTs 810 in other blocks 802 with an inter-block switch 803. In an example, a GOT 810 has a first and second input 814, 816, and an output 818. The first input 814 is coupled to a first SME 804 of the GOT 810 and the second input 814 is coupled to a second SME 804 of the GOT 810.

In an example, the row 806 includes a first and second plurality of row interconnection conductors 820, 822. In an example, an input 814, 816 of a GOT 810 can be coupled to one or more row interconnection conductors 820, 822, and an output 818 can be coupled to one row interconnection conductor 820, 822. In an example, a first plurality of the row interconnection conductors 820 can be coupled to each SME 804 of each GOT 810 within the row 806. A second plurality of the row interconnection conductors 822 can be coupled to one SME 804 of each GOT 810 within the row 806, but cannot be coupled to the other SME 804 of the GOT 810. In an example, a first half of the second plurality of row interconnection conductors 822 can couple to first half of the SMEs 804 within a row 806 (one SME 804 from each GOT 810) and a second half of the second plurality of row interconnection conductors 822 can couple to a second half of the SMEs 804 within a row 806 (the other SME 804 from each GOT 810). The limited connectivity between the second plurality of row interconnection conductors 822 and the SMEs 804, 805 is referred to herein as "parity". In an example, the row 806 can also include a special purpose element 824 such as a counter, a programmable Boolean logic element, a field programmable gate array (FPGA), an application specific integrated circuit (ASIC), a programmable processor (e.g., a microprocessor), and other elements.

In an example, the special purpose element 824 includes a counter (also referred to herein as counter 824). In an example, the counter 824 comprises a 12-bit programmable down counter. The 12-bit programmable counter 824 has a counting input, a reset input, and zero-count output. The counting input, when asserted, decrements the value of the counter 824 by one. The reset input, when asserted, causes the counter 824 to load an initial value from an associated register. For the 12-bit counter 824, up to a 12-bit number can be loaded in as the initial value. When the value of the counter 824 is decremented to zero (0), the zero-count output is asserted. The counter 824 also has at least two modes, pulse and hold. When the counter 824 is set to pulse mode, the zero-count output is asserted during the clock cycle when the counter 824 decrements to zero, and at the next clock cycle the zero-count output is no longer asserted. When the counter 824 is set to hold mode the zero-count output is asserted during the clock cycle when the counter 824 decrements to zero, and stays asserted until the counter 824 is reset by the reset input being asserted. In an example, the special purpose element 824 includes Boolean logic. In some examples, this Boolean logic can be used to extract information from terminal state SMEs in FSM engine 800. The information extracted can be used to transfer state information to other FSM engines 800 and/or to transfer programming information used to reprogram FSM engine 800, or to reprogram another FSM engine 800.

Figure 11:
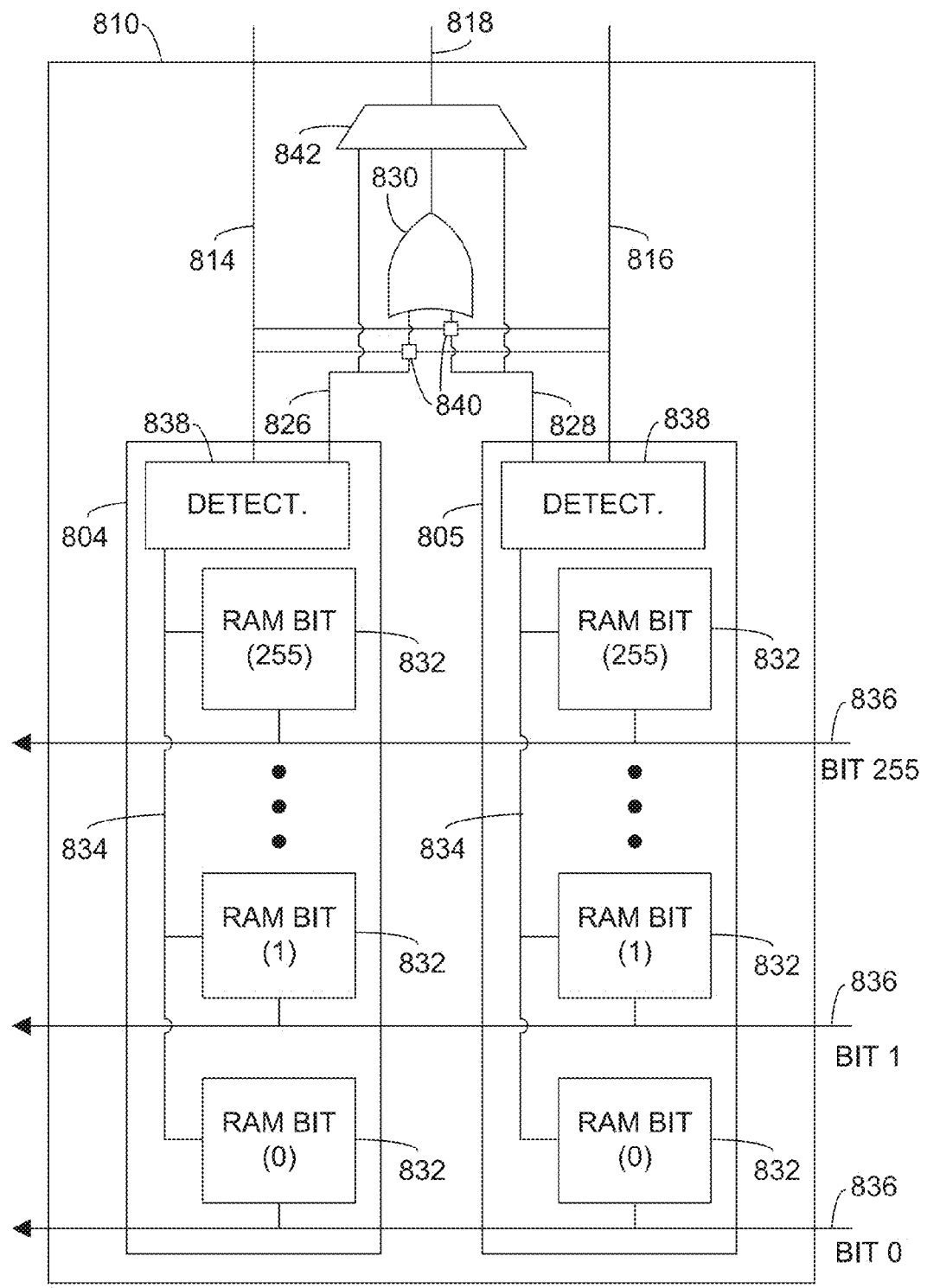
FIG. 11 illustrates an example of a group of two of the row of FIG. 10, according to various embodiments of the invention.

FIG. 11 illustrates an example of a GOT 810. The GOT 810 includes a first SME 804 and a second SME 805 having inputs 814, 816 and having their outputs 826, 828 coupled to an OR gate 830 and a 3-to-1 multiplexer 842. The 3-to-1 multiplexer 842 can be set to couple the output 818 of the GOT 810 to either the first SME 804, the second SME 805, or the OR gate 830. The OR gate 830 can be used to couple together both outputs 826, 828 to form the common output 818 of the GOT 810. In an example, the first and second SME 804, 805 exhibit parity, as discussed above, where the input 814 of the first SME 804 can be coupled to some of the row interconnect conductors 822 and the input 816 of the second SME 805 can be coupled to other row interconnect conductors 822. In an example, the two SMEs 804, 805 within a GOT 810 can be cascaded and/or looped back to themselves by setting either or both of switches 840. The SMEs 804, 805 can be cascaded by coupling the output 826, 828 of the SMEs 804, 805 to the input 814, 816 of the other SME 804, 805. The SMEs 804, 805 can be looped back to themselves by coupling the output 826, 828 to their own input 814, 816. Accordingly, the output 826 of the first SME 804 can be coupled to neither, one, or both of the input 814 of the first SME 804 and the input 816 of the second SME 805.

In an example, a state machine element 804, 805 comprises a plurality of memory cells 832, such as those often used in dynamic random access memory (DRAM), coupled in parallel to a detect line 834. One such memory cell 832 comprises a memory cell that can be set to a data state, such as one that corresponds to either a high or a low value (e.g., a 1 or 0). The output of the memory cell 832 is coupled to the detect line 834 and the input to the memory cell 832 receives signals based on data on the data stream line 836. In an example, an input on the data stream line 836 is decoded to select one of the memory cells 832. The selected memory cell 832 provides its stored data state as an output onto the detect line 834. For example, the data received at the data input port 809 can be provided to a decoder (not shown) and the decoder can select one of the data stream lines 836. In an example, the decoder can convert an ACSII character to 1 of 256 bits.

A memory cell 832, therefore, outputs a high signal to the detect line 834 when the memory cell 832 is set to a high value and the data on the data stream line 836 corresponds to the memory cell 832. When the data on the data stream line 836 corresponds to the memory cell 832 and the memory cell 832 is set to a low value, the memory cell 832 outputs a low signal to the detect line 834. The outputs from the memory cells 832 on the detect line 834 are sensed by a detect circuit 838. In an example, the signal on an input line 814, 816 sets the respective detect circuit 838 to either an active or inactive state. When set to the inactive state, the detect circuit 838 outputs a low signal on the respective output 826, 828 regardless of the signal on the respective detect line 834. When set to an active state, the detect circuit 838 outputs a high signal on the respective output line 826, 828 when ahigh signal is detected from one of the memory cells 834 of the respective SME 804, 805. When in the active state, the detect circuit 838 outputs a low signal on the respective output line 826, 828 when the signals from all of the memory cells 834 of the respective SME 804, 805 are low.

In an example, an SME 804, 805 includes 256 memory cells 832 and each memory cell 832 is coupled to a different data stream line 836. Thus, an SME 804, 805 can be programmed to output a high signal when a selected one or more of the data stream lines 836 have a high signal thereon. For example, the SME 804 can have a first memory cell 832 (e.g., bit 0) set high and all other memory cells 832 (e.g., bits 1-255) set low. When the respective detect circuit 838 is in the active state, the SME 804 outputs a high signal on the output 826 when the data stream line 836 corresponding to bit 0 has a high signal thereon. In other examples, the SME 804 can be set to output a high signal when one of multiple data stream lines 836 have a high signal thereon by setting the appropriate memory cells 832 to a high value.

In an example, a memory cell 832 can be set to a high or low value by reading bits from an associated register. Accordingly, the SMEs 804 can be programmed by storing an image created by the compiler into the registers and loading the bits in the registers into associated memory cells 832. In an example, the image created by the compiler includes a binary image of high and low (e.g., 1 and 0) bits. The image can program the FSM engine 800 to operate as a FSM by cascading the SMEs 804, 805. For example, a first SME 804 can be set to an active state by setting the detect circuit 838 to the active state. The first SME 804 can be set to output a high signal when the data stream line 836 corresponding to bit 0 has a high signal thereon. The second SME 805 can be initially set to an inactive state, but can be set to, when active, output a high signal when the data stream line 836 corresponding to bit 1 has a high signal thereon. The first SME 804 and the second SME 805 can be cascaded by setting the output 826 of the first SME 804 to couple to the input 816 of the second SME 805. Thus, when a high signal is sensed on the data stream line 836 corresponding to bit 0, the first SME 804 outputs a high signal on the output 826 and sets the detect circuit 838 of the second SME 805 to an active state. When a high signal is sensed on the data stream line 836 corresponding to bit 1, the second SME 805 outputs a high signal on the output 828 to activate another SME 805 or for output from the FSM engine 800.

FIG. 10 illustrates an example of a method 1000 for a compiler to convert source code into an image configured to program a parallel machine.

Method 1000 includes parsing the source code into a syntax tree (block 1002), converting the syntax tree into an automaton (block 1004), optimizing the automaton (block 1006), converting the automaton into a netlist (block 1008), placing the netlist on hardware (block 1010), routing the netlist (block 1012), and publishing the resulting image (block 1014).

Figure 13:
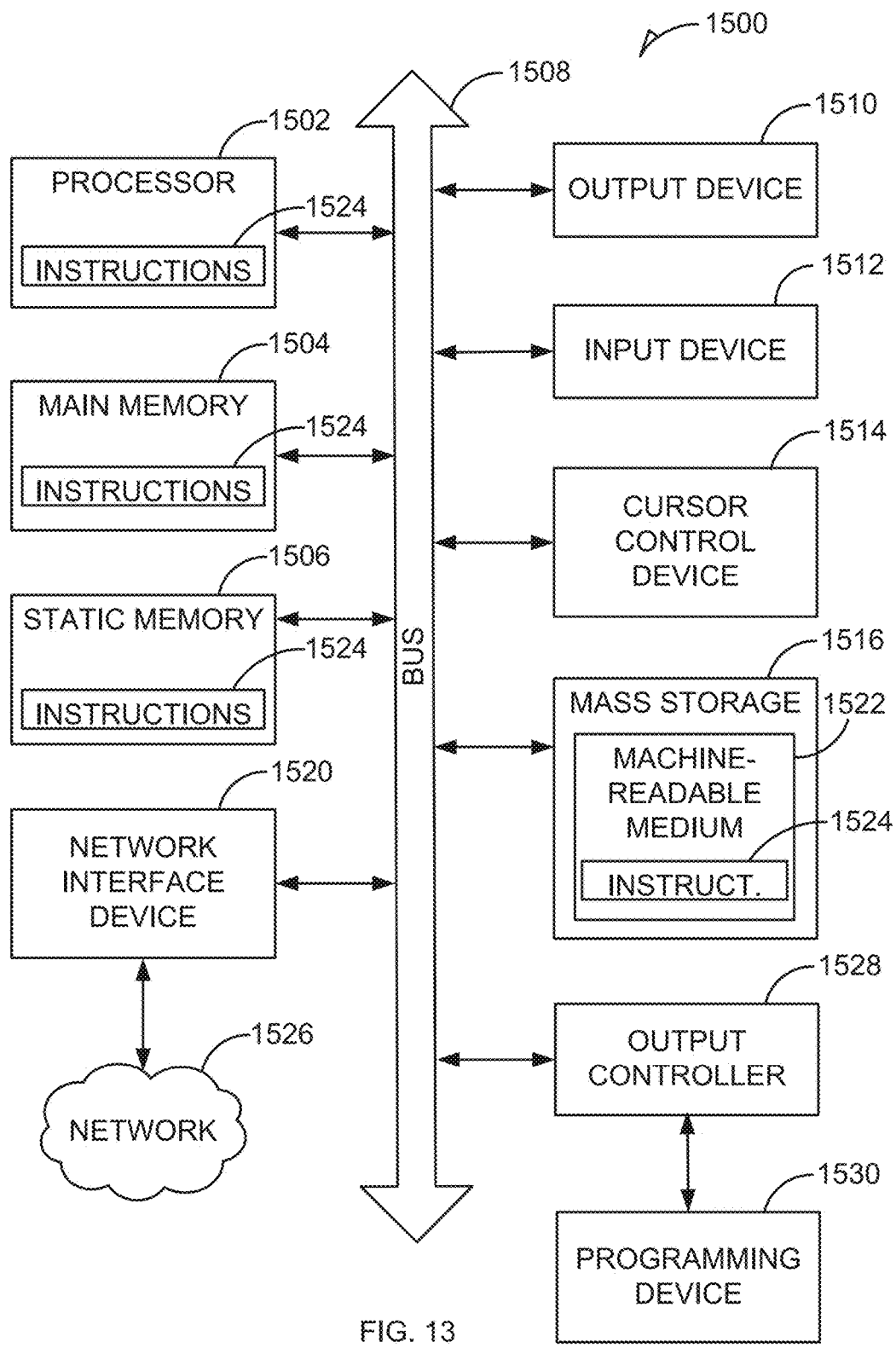
FIG. 13 illustrates an example of a computer having a von Neumann based architecture, according to various embodiments of the invention.

In an example, the compiler includes an application programming interface (API) that allows software developers to create images for implementing FSMs on the FSM engine 800. The compiler provides methods to convert an input set of regular expressions in the source code into an image that is configured to program the FSM engine 800. The compiler can be implemented by instructions for a computer having a von Neumann architecture. These instructions can cause a processor on the computer to implement the functions of the compiler. For example, the instructions, when executed by the processor, can cause the processor to perform actions as described in blocks 1002, 1004, 1006, 1008, 1010, 1012, and 1014 on source code that is accessible to the processor. An example computer having a von Neumann architecture is shown in FIG. 13 and described below.

In an example, the source code describes search strings for identifying patterns of symbols within a group of symbols. To describe the search strings, the source code can include a plurality of regular expressions (regexs). A regex can be a string for describing a symbol search pattern. Regexes are widely used in various computer domains, such as programming languages, text editors, network security, and others. In an example, the regular expressions supported by the compiler include search criteria for the search of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 1002 the compiler can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexs in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler can support multiple languages of source code, parsing converts the source code, regardless of the language, into a non-language specific representation, e.g., a syntax tree. Thus, further processing (blocks 1004, 1006, 1008, 1010) by the compiler can work from a common input structure regardless of the language of the source code.

As noted above, the syntax tree includes a plurality of operators that are relationally connected. A syntax tree can include multiple different types of operators. That is, different operators can correspond to different functions implemented by the regexes in the source code.

At block 1004, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states. In an example, the automaton can be converted based partly on the hardware of the FSM engine 800.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p,α), is shown by a directed connection from node p to node q. In an example, a reversal of an automaton produces a new automaton where each transition p→q on some symbol α is reversed q→p on the same symbol. In a reversal, start state becomes a final state and the final states become start states. In an example, the language accepted (e.g., matched) by an automaton is the set of all possible character strings which when input sequentially into the automaton will reach a final state. Each string in the language accepted by the automaton traces a path from the start state to one or more final states.

At block 1006, after the automaton is constructed, the automaton is optimized to, among other things, reduce its complexity and size. The automaton can be optimized by combining redundant states.

At block 1008, the optimized automaton is converted into a netlist. Converting the automaton into a netlist maps each state of the automaton to a hardware element (e.g., SMEs 804, 805, other elements 824) on the FSM engine 800, and determines the connections between the hardware elements.

At block 1010, the netlist is placed to select a specific hardware element of the target device (e.g., SMEs 804, 805, special purpose elements 824) corresponding to each node of the netlist. In an example, placing selects each specific hardware element based on general input and output constraints for of the FSM engine 800.

At block 1012, the placed netlist is routed to determine the settings for the programmable switches (e.g., inter-block switches 803, intra-block switches 808, and intra-row switches 812) in order to couple the selected hardware elements together to achieve the connections describe by the netlist. In an example, the settings for the programmable switches are determined by determining specific conductors of the FSM engine 800 that will be used to connect the selected hardware elements, and the settings for the programmable switches. Routing can take into account more specific limitations of the connections between the hardware elements that placement at block 1010. Accordingly, routing may adjust the location of some of the hardware elements as determined by the global placement in order to make appropriate connections given the actual limitations of the conductors on the FSM engine 800.

Once the netlist is placed and routed, the placed and routed netlist can be converted into a plurality of bits for programming of a FSM engine 800. The plurality of bits are referred to herein as an image.

At block 1014, an image is published by the compiler. The image comprises a plurality of bits for programming specific hardware elements and/or programmable switches of the FSM engine 800. In embodiments where the image comprises a plurality of bits (e.g., 0 and 1), the image can be referred to as a binary image. The bits can be loaded onto the FSM engine 800 to program the state of SMEs 804, 805, the special purpose elements 824, and the programmable switches such that the programmed FSM engine 800 implements a FSM having the functionality described by the source code. Placement (block 1010) and routing (block 1012) can map specific hardware elements at specific locations in the FSM engine 800 to specific states in the automaton. Accordingly, the bits in the image can program the specific hardware elements and/or programmable switches to implement the desired function(s). In an example, the image can be published by saving the machine code to a computer readable medium. In another example, the image can be published by displaying the image on a display device. In still another example, the image can be published by sending the image to another device, such as a programming device for loading the image onto the FSM engine 800. In yet another example, the image can be published by loading the image onto a parallel machine (e.g., the FSM engine 800).

In an example, an image can be loaded onto the FSM engine 800 by either directly loading the bit values from the image to the SMEs 804, 805 and other hardware elements 824 or by loading the image into one or more registers and then writing the bit values from the registers to the SMEs 804, 805 and other hardware elements 824. In an example, the state of the programmable switches (e.g., inter-block switches 803, intra-block switches 808, and intra-row switches 812). In an example, the hardware elements (e.g., SMEs 804, 805, other elements 824, programmable switches 803, 808, 812) of the FSM engine 800 are memory mapped such that a programming device and/or computer can load the image onto the FSM engine 800 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

FIG. 13 illustrates generally an example of a computer 1500 having a von Neumann architecture. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language, such as Java, C++, or one or more other languages. Alternatively, the programs can be structured in a procedure-orientated format using a procedural language, such as assembly, C, etc. The software components can communicate using any of a number of mechanisms well known to those of ordinary skill in the art, such as application program interfaces or interprocess communication techniques, including remote procedure calls or others. The teachings of various embodiments are not limited to any particular programming language or environment.

Thus, other embodiments can be realized. For example, an article of manufacture, such as a computer, a memory system, a magnetic or optical disk, some other storage device, or any type of electronic device or system can include one or more processors 1502 coupled to a computer-readable medium 1522 such as a memory (e.g., removable storage media, as well as any memory including an electrical, optical, or electromagnetic conductor) having instructions 1524 stored thereon (e.g., computer program instructions), which when executed by the one or more processors 1502 result in performing any of the actions described with respect to the methods above.

The computer 1500 can take the form of a computer system having a processor 1502 coupled to a number of components directly, and/or using a bus 1508. Such components can include main memory 1504, static or non-volatile memory 1506, and mass storage 1516. Other components coupled to the processor 1502 can include an output device 1510, such as a video display, an input device 1512, such as a keyboard, and a cursor control device 1514, such as a mouse. A network interface device 1520 to couple the processor 1502 and other components to a network 1526 can also be coupled to the bus 1508. The instructions 1524 can further be transmitted or received over the network 1526 via the network interface device 1520 utilizing any one of a number of well-known transfer protocols (e.g., HTTP). Any of these elements coupled to the bus 1508 can be absent, present singly, or present in plural numbers, depending on the specific embodiment to be realized.

In an example, one or more of the processor 1502, the memories 1504, 1506, or the storage device 1516 can each include instructions 1524 that, when executed, can cause the computer 1500 to perform any one or more of the methods described herein. In alternative embodiments, the computer 1500 operates as a standalone device or can be connected (e.g., networked) to other devices. In a networked environment, the computer 1500 can operate in the capacity of a server or a client device in server-client network environment, or as a peer device in a peer-to-peer (or distributed) network environment. The computer 1500 can include a personal computer (PC), a tablet PC, a set-top box (STB), a Personal Digital Assistant (PDA), a cellular telephone, a web appliance, a network router, switch or bridge, or any device capable of executing a set of instructions (sequential or otherwise) that specify actions to be taken by that device. Further, while only a single computer 1500 is illustrated, the term "computer" shall also be taken to include any collection of devices that individually or jointly execute a set (or multiple sets) of instructions to perform any one or more of the methodologies discussed herein.

The computer 1500 can also include an output controller 1528 for communicating with peripheral devices using one or more communication protocols (e.g., universal serial bus (USB), IEEE 1394, etc.) The output controller 1528 can, for example, provide an image to a programming device 1530 that is communicatively coupled to the computer 1500. The programming device 1530 can be configured to program a parallel machine (e.g., parallel machine 100, FSM engine 800). In other examples, the programming device 1530 can be integrated with the computer 1500 and coupled to the bus 1508 or can communicate with the computer 1500 via the network interface device 1520 or another device.

While the computer-readable medium 1524 is shown as a single medium, the term "computer-readable medium" should be taken to include a single medium or multiple media (e.g., a centralized or distributed database, or associated caches and servers, and or a variety of storage media, such as the processor 1502 registers, memories 1504, 1506, and the storage device 1516) that store the one or more sets of instructions 1524. The term "computer-readable medium" shall also be taken to include any medium that is capable of storing, encoding or carrying a set of instructions for execution by the computer and that cause the computer to perform any one or more of the methodologies of the present invention, or that is capable of storing, encoding or carrying data structures utilized by or associated with such a set of instructions. The term "computer-readable medium" shall accordingly be taken to include, but not be limited to tangible media, such as solid-state memories, optical, and magnetic media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A method for analyzing data patterns using configurable states of hardware processing elements to perform operations, where the hardware processing elements are included in a device configurable to implement arrangements of state machine elements to implement a first parallel machine and a second parallel machine via the state machine elements, based on interconnection among the state machine elements controlled by programmable switches, and the operations comprising:

searching for a first pattern, using the first parallel machine, to determine whether a first data set includes the first pattern, wherein the first parallel machine is implemented in the device with a first configuration of the hardware processing elements, wherein the first configuration is implemented from a first interconnection of the hardware processing elements via a first set of the programmable switches, and wherein the first configuration arranges the hardware processing elements to function as respective states of a first finite state machine;

outputting, from the first parallel machine, an indication of whether the first data set includes the first pattern;

searching for a second pattern, using the second parallel machine, to determine whether a second data set includes the second pattern, the determination based on the indication of whether the first data set includes the first pattern, wherein the second parallel machine is implemented in the device with a second configuration of the hardware processing elements, wherein the indication of whether the first data set includes the first pattern determines at least in part the second configuration of the hardware processing elements, wherein the second configuration is implemented from a second interconnection of the hardware processing elements via a second set of the programmable switches, and wherein the second configuration arranges the hardware processing elements to function as respective states of a second finite state machine; and outputting, from the second parallel machine, an indication of whether the second data set includes the second pattern;

programming hardware processing elements of another parallel machine, based on the indication of whether the second data set includes the second pattern, wherein the another parallel machine is implemented with another configuration of hardware processing elements of the another parallel machine, wherein the indication of whether the second data set includes the second pattern determines at least in part the configuration of the hardware processing elements of the another parallel machine, wherein the programming of the hardware processing elements of the another parallel machine creates a third configuration via a third set of programmable switches, and wherein the third configuration arranges the hardware processing elements of the another parallel machine to function as respective states of a third finite state machine for pattern matching operations.

2. The method of claim 1, wherein the indication of whether the first data set includes the first pattern is provided within the second data set.

3. The method of claim 1, wherein the another parallel machine is the first parallel machine, and wherein the programming configures the first parallel machine for pattern matching operations based on the indication of whether the second data set includes the second pattern.

4. The method of claim 1, further comprising outputting the second data set from the first parallel machine for use by the second parallel machine, the second data set being based on a reaction of programmable hardware processing elements that implement the first parallel machine to the first data set.

5. The method of claim 4, wherein the indication of whether the first data set includes the first pattern is provided within the second data set, wherein the second data set includes a word having a plurality of bits indicating matches and non-matches to a plurality of patterns, and wherein the plurality of patterns includes the first pattern.

6. The method of claim 4, wherein the second data set comprises a state vector corresponding to a state of programmable hardware processing elements that implement the first parallel machine after pattern matching.

7. The method of claim 1, wherein determining, using the first parallel machine, whether the first data set includes the first pattern, includes determining whether the first data set includes a sequence of interest.

8. The method of claim 1, wherein determining, using the first parallel machine, whether the first data set includes the first pattern, includes determining whether a sequence of characters is recognized in the first data set.

9. The method of claim 1, further comprising determining, using the second parallel machine, whether the first data set includes the second pattern.

10. The method of claim 1, further comprising reconfiguring the first parallel machine for the pattern matching operations based on the second pattern recognized in the second data set by the second parallel machine.

11. The method of claim 10, wherein reconfiguring the first parallel machine for the pattern matching operations includes:
compiling a program for the first parallel machine to perform the pattern matching operations based on the second pattern recognized in the second data set, wherein the program defines the second interconnection.

12. The method of claim 1, wherein the another parallel machine is a third parallel machine, wherein the third parallel machine is implemented with a third configurable state of the hardware processing elements, and the method further comprising:

determining whether a third data set includes a third pattern using the third parallel machine;
outputting, from the third parallel machine, an indication of whether the third pattern was recognized in the third data set; and
configuring at least one of the first parallel machine or the second parallel machine based on the indication of whether the third pattern was recognized in the third data set.

13. An apparatus for processing data comprising:
a hierarchy of programmable switches;
hardware processing elements that include state machine elements, wherein a given state machine element of the hardware processing elements is a physical component that represents a single state in a given finite state machine, and wherein the hardware processing elements are coupled via programmable switches;
circuitry of a first parallel machine implemented from a first configuration of a first plurality of the hardware processing elements, wherein the first configuration is provided from a first interconnection of the hardware processing elements via a first set of the programmable switches and a first mapping of the state machine elements to respective states in a first finite state machine, and wherein the first parallel machine is configured to:
search to determine whether a first data set includes a first pattern; and
generate an indication of whether the first pattern is recognized in the first data set; and
circuitry of a second parallel machine implemented from a second configuration of a second plurality of the hardware processing elements, the second parallel machine adapting operations in the second configuration of the second plurality of the hardware processing elements in response to the indication of whether the first pattern is recognized in the first data set, wherein the second configuration is provided from a second interconnection of the hardware processing elements via a second set of the programmable switches and a second mapping of the state machine elements to respective states in a second finite state machine, and wherein the second parallel machine is configured to:
search for a second pattern to determine whether a second data set includes the second pattern; and
generate an indication of whether the second pattern is recognized in the second data set;
circuitry to program hardware processing elements of another parallel machine, based on the indication of whether the second pattern is recognized in the second data set, wherein the another parallel machine is implemented with another configuration of hardware processing elements of the another parallel machine, and wherein the indication of whether the second pattern is recognized in the second data set determines at least in part the another configuration of the hardware processing elements,
wherein use of the program on the hardware processing elements of the another parallel machine creates a third configuration via a third set of programmable switches, and wherein the third configuration arranges the hardware processing elements of the another parallel machine to function as respective states of a third finite state machine for pattern matching operations.

14. The apparatus of claim 13, further comprising circuitry of a third parallel machine implemented by the third configuration of a third plurality of the hardware processing elements, the third parallel machine to perform operations based on the indication of whether the second pattern is recognized in the second data set.

15. The apparatus of claim 13, wherein the second parallel machine is further configured to:
   receive the second data set in a data stream produced by the first parallel machine; and
   recognize the second pattern in the data stream.

16. The apparatus of claim 13, wherein the first parallel machine includes an interface to receive a reconfiguration of the first parallel machine for subsequent operations based on the indication of whether the second pattern is recognized in the second data set.

17. The apparatus of claim 16, further comprising a processing device coupled to the second parallel machine, the processing device configured to:
   analyze the indication of whether the second pattern is recognized in the second data set; and
   compile an update program for the first parallel machine as a function of whether the second pattern is recognized in the second data set, wherein the update program implements the reconfiguration by defining of the second interconnection and the second mapping.

18. A non-transitory computer-readable storage medium, the non-transitory computer readable storage medium including instructions for analyzing data patterns using configurable states of hardware processing elements, where the hardware processing elements are included in a device configurable to implement arrangements of state machine elements, wherein the instructions when executed, implement a first parallel machine and a second parallel machine, the first parallel machine and the second parallel machine implemented via the state machine elements and interconnection among the state machine elements controlled by programmable switches, with operations that:
   configure a first parallel machine, wherein the first parallel machine is implemented with a first configuration of the hardware processing elements, wherein the first configuration is provided from a first interconnection of the hardware processing elements via a first set of the programmable switches and a first mapping of the state machine elements to respective states in a first finite state machine, and wherein the first parallel machine includes a first data input port and a first output port, and the first parallel machine being configured by the instructions to:
      search for a first pattern in first data received at the first data input port; and
      output second data at the first output port, the second data providing an indication of whether the first pattern is recognized in the first data; and
   configure a second parallel machine, wherein the second parallel machine includes a second data input port and a second output port, wherein the second parallel machine is implemented with a second configuration of the hardware processing elements, wherein the second configuration is provided from a second interconnection of the hardware processing elements via a second set of the programmable switches and a second mapping of the state machine elements to respective states in a second finite state machine, and wherein the second data input port is coupled to the first output port of the first parallel machine, and the second parallel machine being configured by the instructions to:
      search for a second pattern in the second data received at the second data input port from the first parallel machine, and wherein the indication of whether the first pattern is recognized in the first data determines at least in part the second configuration of the hardware processing elements; and
      output third data at the second output port, the third data providing an indication of whether the second pattern is recognized in the second data;
   generate a program to configure hardware processing elements of another parallel machine, based on the indication of whether the second data set includes the second pattern, wherein the another parallel machine is implemented with another configuration of hardware processing elements of the another parallel machine, wherein the indication of whether the second data set includes the second pattern determines at least in part the another configuration of the hardware processing elements;
   wherein use of the program on the hardware processing elements of the another parallel machine creates a third configuration via a third set of programmable switches, and wherein the third configuration arranges the hardware processing elements of the another parallel machine to function as respective states of a third finite state machine for pattern matching operations.

19. The non-transitory computer-readable storage medium of claim 18, wherein the first parallel machine includes an interface capable to receive a program based on the third data, the program capable to reconfigure the first parallel machine based on the indication of whether the second pattern is recognized in the second data.

20. The non-transitory computer-readable storage medium of claim 18, wherein the second parallel machine is further configured by the instructions to:
   receive the second data in a data stream produced by the first parallel machine; and
   recognize the second pattern in the data stream.

* * * * *